(12) United States Patent
Balasubramanian et al.

(10) Patent No.: US 10,438,257 B1
(45) Date of Patent: Oct. 8, 2019

(54) METHOD, SYSTEM, AND NON-TRANSITORY COMPUTER-READABLE MEDIUM FOR MANAGING PRICING OF CHANNELS INCLUDED IN COMPOSITE CHANNELS OF AN INTERNET-BASED CONTENT PLATFORM

(71) Applicant: Google Inc., Mountain View, CA (US)

(72) Inventors: Prabhu Balasubramanian, Mountain View, CA (US); John Thomas, Mountain View, CA (US); Akash Hasmukh Parikh, Mountain View, CA (US); Shishir Mehrotra, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 342 days.

(21) Appl. No.: 14/675,358

(22) Filed: Mar. 31, 2015

Related U.S. Application Data

(60) Provisional application No. 61/973,180, filed on Mar. 31, 2014.

(51) Int. Cl.
*G06Q 30/00* (2012.01)
*G06Q 30/06* (2012.01)
*G06Q 30/02* (2012.01)
*H04N 21/2385* (2011.01)
*H04N 21/2668* (2011.01)
*H04N 21/438* (2011.01)
(Continued)

(52) U.S. Cl.
CPC ..... *G06Q 30/0621* (2013.01); *G06Q 30/0283* (2013.01); *H04N 21/2385* (2013.01); *H04N 21/25435* (2013.01); *H04N 21/2668* (2013.01); *H04N 21/4383* (2013.01); *H04N 21/458* (2013.01); *H04N 21/4622* (2013.01)

(58) Field of Classification Search
CPC .................................................. G06Q 30/0621
USPC ....................................... 705/26.1–27.2, 26.5
See application file for complete search history.

(56) References Cited

U.S. PATENT DOCUMENTS

| 8,620,891 B1* | 12/2013 | Thirumalai | ....... G06F 17/30867 707/705 |
| 2007/0112575 A1* | 5/2007 | Savoor | ............. G06Q 10/06375 705/7.34 |

(Continued)

OTHER PUBLICATIONS

Verizon launches personalized FiOS service bundles with more choices and more flexibility: Customers can create bundles to fit their digital lifestyles. (Jun. 6, 2011). PR Newswire Retrieved from https://search.proquest.com/docview/870297109?accountid=14753 (Year: 2011).*

(Continued)

*Primary Examiner* — Abby J Flynn
*Assistant Examiner* — Arielle E Weiner
(74) *Attorney, Agent, or Firm* — Lowenstein Sandler LLP

(57) ABSTRACT

An internet-based content platform that includes subscribable channels is provided. The internet-based content platform provides channels to end users. Prices are defined for including one or more channels in one or more composite channels. The prices may be provided to channel curators associated with the one or more composite channels and the one or more channel curators may accept or reject the prices for including the one or more channels in the one or more composite channels.

15 Claims, 14 Drawing Sheets

(51) Int. Cl.
*H04N 21/458* (2011.01)
*H04N 21/462* (2011.01)
*H04N 21/2543* (2011.01)

(56) References Cited

U.S. PATENT DOCUMENTS

| | | | | |
|---|---|---|---|---|
| 2011/0321072 A1* | 12/2011 | Patterson | ......... | H04N 21/44222 |
| | | | | 725/5 |
| 2012/0245988 A1* | 9/2012 | Pace | ................. | G06Q 30/0283 |
| | | | | 705/14.25 |
| 2013/0103592 A1* | 4/2013 | Shenk | .................... | G06Q 30/08 |
| | | | | 705/80 |
| 2015/0149327 A1* | 5/2015 | Fonarev | ................ | H04L 65/403 |
| | | | | 705/27.1 |

OTHER PUBLICATIONS

Wikipedia, "Now TV," Feb. 8, 2016, 5 pages, <https://en.wikipedia.org/wiki/Now_TV>.

* cited by examiner

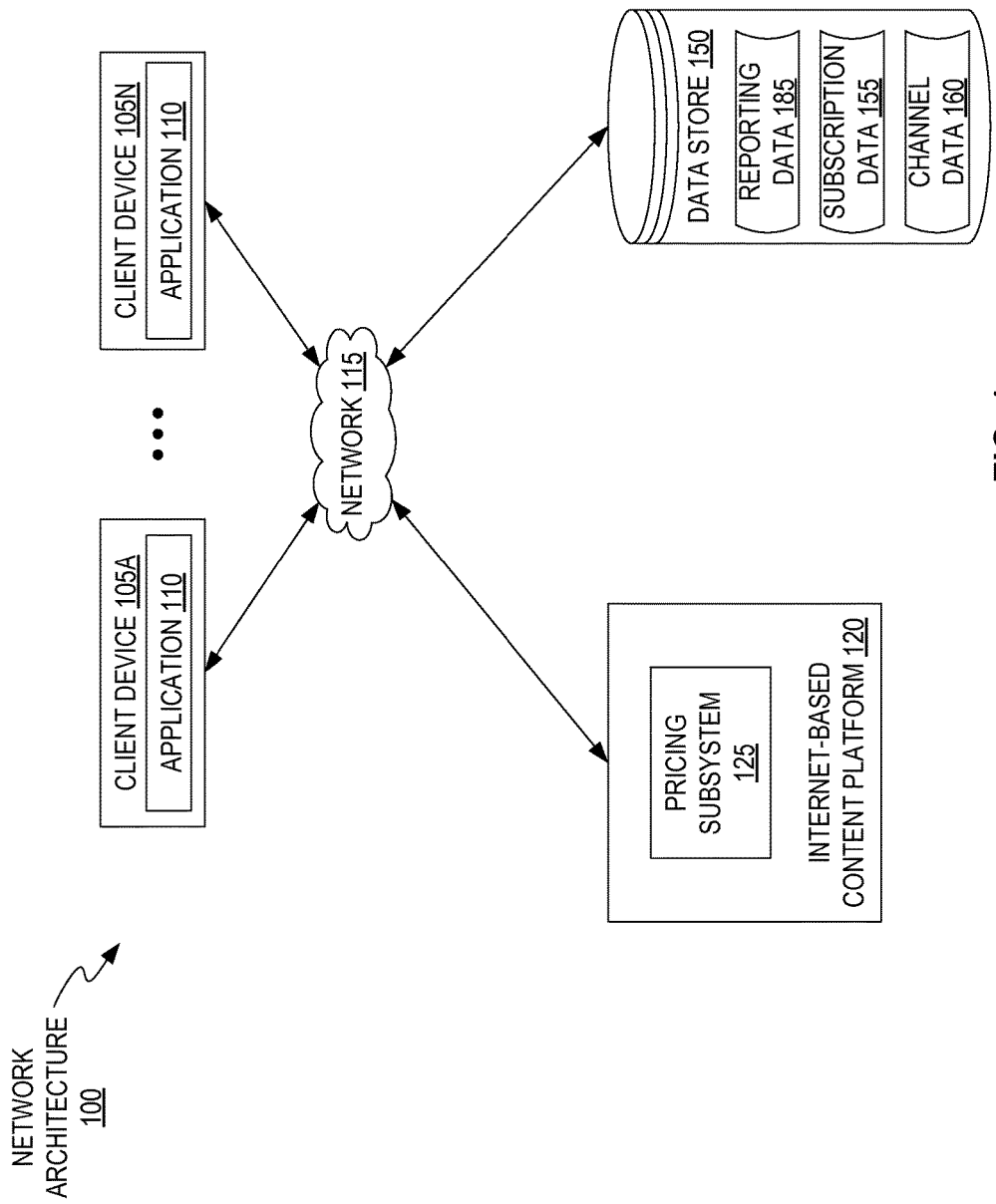

METHOD, SYSTEM, AND NON-TRANSITORY COMPUTER-READABLE MEDIUM FOR MANAGING PRICING OF CHANNELS INCLUDED IN COMPOSITE CHANNELS OF AN INTERNET-BASED CONTENT PLATFORM

CROSS-REFERENCE TO RELATED APPLICATIONS

This application claims the benefit of U.S. Provisional Application No. 61/973,180, entitled, "MANAGING PRICING OF CHANNELS INCLUDED IN COMPOSITE CHANNELS OF AN INTERNET-BASED CONTENT PLATFORM," filed Mar. 31, 2014, the entire content of which are incorporated herein by reference.

TECHNICAL FIELD

Embodiments of the present disclosure relate to the field of media consumption and, more particularly, to managing inclusion of channels in composite channels of an internet-based content platform.

BACKGROUND

Online content sharing platforms typically allow users to upload, view, and share digital content such as media items. Media items may include audio clips, movie clips, TV clips, music videos, images, or other multimedia content. Users may use computing devices (such as smart phones, cellular phones, laptop computers, desktop computers, netbooks, tablet computers) to use, play, and/or otherwise consume media items (e.g., watch digital videos, and/or listen to digital music).

Media items may be provided to a user through channels and/or composite channels. A channel may include content available from a common source, or content having a common subject or theme. Users may want to subscribe to a composite channel in order to access a greater variety of content because the composite channel may include content from multiple channels. Users may also want to subscribe to a composite channel to save on costs because subscribing to a composite channel that includes multiple channels may be cheaper than subscribing to each of the multiple channels individually.

SUMMARY

The below summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one embodiment, a method of defining prices for including a channel in an internet-based content platform in one or more composite channels is provided. A request to search for composite channels that match one or more packaging criteria is received from a first channel curator. A first composite channel matching the one or more packaging criteria is identified. A price for including the channel in the first composite channel is determined and the price is provided to a second channel curator associated with the first composite channel.

In another embodiment, a method of identifying a channel to include in a composite channel of an internet-based content platform is provided. A request to search for channels that are available to be included the composite channel is received. A set of channels is identified and data indicative of the set of channels is provided to a channel curator associated with the composite channel.

In additional embodiments, computing devices for performing the operations described herein are also implemented. Additionally, in embodiments of the disclosure, a computer readable storage media stores instructions for performing the operations of the above described embodiments. In other implementations, an apparatus that includes means for performing the operations described herein are also implemented.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

FIG. 1 is a block diagram illustrating an example network architecture in which embodiments of the present disclosure may operate, according to one embodiment of the present disclosure.

DETAILED DESCRIPTION

Figure 2A:
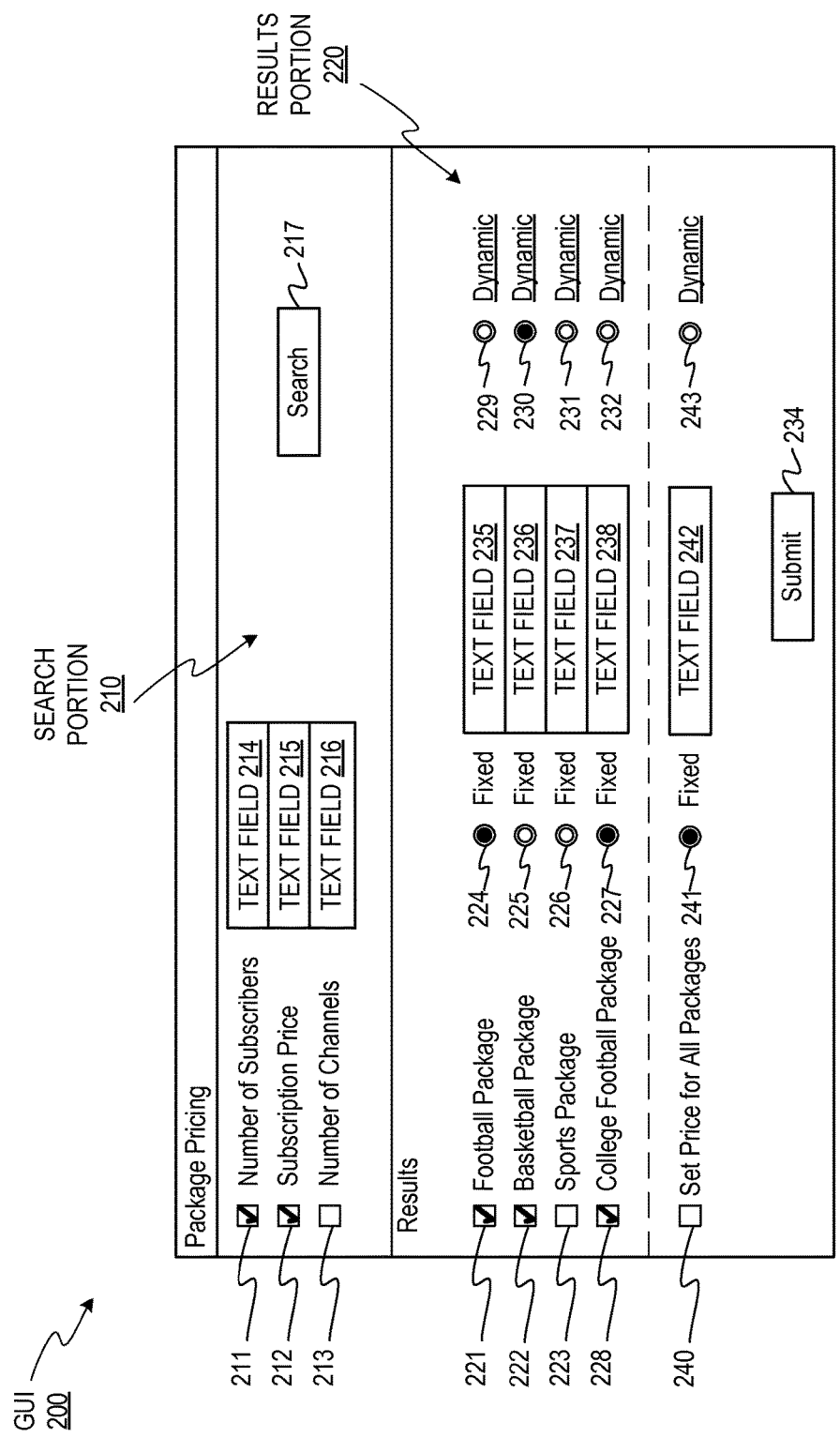
FIG. 2A is a diagram illustrating a graphical user interface (GUI) for defining one or more prices for including a channel in one or more composite channels, according to one embodiment of the present disclosure.

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

An internet-based content platform can be any platform that facilitates content uploading, sharing of content and feedback among various entities (e.g., individuals, organizations, etc.) and/or content curation. A channel can be data content available from a common source or data content having a common topic or theme. A channel can be associated with a channel curator. A channel curator may refer to an entity (e.g., an individual, an organization or a system) that can perform management actions (e.g., adding/removing media items, defining subscription prices, etc.) on the channel. Each channel may include one or more media items. Examples of a media items can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc., media items comprising at least one of a video item, an audio item, an image, a blog entry, a tweet, a social network post, an online publication, a software program, or an online video game. As used herein, "content," "content item," "media," "media item," "online media item," "digital media," and a "digital media item" can include an electronic file that can be executed or loaded using software, firmware or hardware configured to present the digital media item to an entity. The internet-based content platform may also include composite channels. A composite channel is a channel that includes at least one individual ("component") channel along with additional content (e.g., another component channel). A channel and/or a composite channel can be a paid channel that can be offered as a paid subscription. A paid subscription may require a recurring payment for temporary access to an experience on the internet-based content platform. Individual paid channels can be available for purchase "a la carte" (i.e., standalone) or as part of a package (e.g., as part of a composite channel). A composite channel may also be referred to as a "package," a "channel package," and/or a "package of channels."

In one embodiment, a first content curator associated with a channel may provide one or more prices for including the channel in one or more composite channels. These prices may be provided to other content curators associated with the one or more composite channels. The other content curators may accept the prices and include the channel in their composite channels. The first content curator may also modify the one or more prices and the other content curators may accept or reject the updated prices. In another embodiment, a second content curator associated with a composite channel may search for channels to include in the composite channel. The second content curator may view prices for including the channels in the composite channels and may select one or more channels to include in the composite channel if the second content curator approves of the prices.

Allowing content curators for channels to identify composite channels that the content curators may want to include their channels in may allow the content curators to obtain additional subscribers and viewers for their content. This may allow the content curators to gain access to a broader audience and/or to generate more revenue. Allowing content curators for composite channels to search for channels to include in their composite channels may allow content curators to more easily increase the number of subscribers to the composite channels and to generate more revenue from subscription fees.

FIG. 1 is a diagram illustrating an example network architecture 100, according to one embodiment of the present disclosure. The network architecture 100 includes client devices 105A through 105N, a network 115, an internet-based content platform 120 and a data store 150. In one implementation, network 115 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) or LTE-Advanced network), routers, hubs, switches, server computers, and/or a combination thereof. In one implementation, the data store 150 may be may be a memory (e.g., random access memory), a cache, a drive (e.g., a hard drive), a flash drive, a database system, or another type of component or device capable of storing data. The data store 150 may also include multiple storage components (e.g., multiple drives or multiple databases) that may also span multiple computing devices (e.g., multiple server computers).

The client devices 105A through 105N may each include computing devices such as personal computers (PCs), laptops, mobile phones, smart phones, tablet computers, netbook computers, e-readers, personal digital assistants (PDA), or cellular phones etc. While only client devices 105A-105N are shown in FIG. 1, network architecture 100 may support a large number of concurrent sessions with many client devices.

Each client device 105A through 105N includes at least one application 110 that allows an end user to subscribe to channels and view content and media items of the channels. For example, the application 110 may be a web browser that can present a list of subscribable channels to the end user. As a web browser, the application can also access, retrieve, present, and/or navigate content (e.g., web pages such as Hyper Text Markup Language (HTML) pages, digital media items, etc.) served by a web server. As discussed above, the channels of the internet-based content platform 120 may include single channels and/or composite channels that may include multiple component channels (e.g., multiple channels). The application 110 may render, display, and/or present the list of subscribable channels and associated content to the end user. The application 110 may also provide an embedded media player (e.g., a Flash® player or an HTML5 player) that is embedded in a web page (e.g., a web page that may provide information about a product sold by an online merchant). In another example, the application 110 may be a standalone application (e.g., a mobile application or mobile app) that allows users to subscribe to channels and consume digital media items (e.g., digital videos, digital images, electronic books, etc.). The application 110 may be provided to the client devices 105A through 105N by the internet-based content platform 120. For example, the application 110 may be a browser that provides a media player that is embedded in a web page provided by the internet-based content platform 120. In another example, the application 110 may be an application that is downloaded from an application distribution platform, such as an "app store" (not shown in the figures).

Client devices 105A through 105N may also be used by channel curators to define and manage one or more channels of the internet-based content platform 120. In one embodiment, the application 110 may be an application that allows a channel curator to manage one or more channels of the internet-based content platform 120. For example, the internet-based content platform 120 may provide a web interface for channel curators to define and manage their channels. The application 110 may be a web browser that channel curators may use to access the web interface to allow the channel curators to manage their channels. In another example, application 110 may be an application (e.g., a mobile app) that communicates with the internet-based content platform 120 and allows channel curators to define and manage their channels in the internet-based content platform 120.

The internet-based content platform 120 may include one or more computing devices, such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components.

The internet-based content platform 120 may provide digital content (e.g., digital video, streaming video, images, digital music, streaming music, social media information, etc.) to one or more of the client devices 105A through 105N and may allow users (e.g., end users and/or channel curators) to share content among multiple users. To provide digital content, for example, the internet-based content platform 120 may allow a user to subscribe to a paid or free channel. The internet-based content platform 120 may present different types of access or different subscriptions levels to the end user. The internet-based content platform 120 can also allow the end user to consume, upload, search for, curate, share, approve of ("like"), dislike, and/or comment on media items of various channels.

Although each of the internet-based content platform 120 and data store 150 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Internet-based content platform 120 may create and manage end user channel subscriptions and may provide content to end users. The internet-based content platform 120 may also manage subscriptions to composite channel. The internet-based content platform 120 may also allow channel curators to create and manage channels, create and manage composite channels, and identify media items that are associated with channels and/or composite channels. Internet-based content platform 120 may include a pricing subsystem 125 that allows channel curators to define pricing (e.g., fees) associated with channels and/or composite channels. The internet-based content platform 120 and the pricing subsystem 125 can interact with the client device 105, such as via the application 110, to communicate data between the internet-based content platform 120 and channel curators/end users. The pricing subsystem 125 can be implemented on a single server, a cluster of servers, a cloud, etc.

The pricing subsystem 125 allows channel curators to define pricing (e.g., fees) for channels in the internet-based content platform 120. In one embodiment, the pricing subsystem 125 allows a channel curator to define one or more prices for subscriptions to channels and/or composite channels. For example, a channel curator may define a subscription fee (e.g., a price) for end users to subscribe to a channel and/or composite channel associated with the channel curator. The prices for subscriptions to the channels and/or composite channels may be referred to as retail prices. A retail price may be a price that is charged directly to a user who subscribes to a channel and/or a composite channel (e.g., a subscriber). In another embodiment, the pricing subsystem allows a channel curator to define one or more prices for including a channel associated with the channel curator in a composite channel. For example, a channel curator may define a packaging price that other channel curators may be charged for including the channel associated with the channel curator in composite channels associated with the other channel curators. The price for including a channel associated with the channel curator in the composite channel may be referred to as a wholesale price.

In one embodiment, a first channel curator associated with a first channel may submit a query for one or more composite channels of the internet-based content platform 120 that match one or more packaging criteria. For example, the first channel curator may submit a query using a GUI provided and/or presented by application 110. The first channel curator may wish to allow other channel curators associated with the one or more composite channels (that match the one or more packaging criteria) to include the first channel in the one or more composite channels. The one or more packaging criteria may be data, factors, conditions, criterion, rules, etc., that a channel curator may use to determine whether to allow other channel curators to include the first channel in their composite channels. Examples of packaging criteria may include, but are not limited to, a subject matter of a composite channel (e.g., sports, movies, art, etc.), a subscription fee or price for a composite channel, a number of component channels in a composite channel, a number of subscribers to a composite channel, geographic availability of a composite channel (e.g., a composite channel or package may be offered in certain countries), demographics of subscribers to a composite channel (e.g., age, gender, etc.), a name for a composite channel, etc. The pricing subsystem 125 may receive the query and may identify composite channels that match the one or more packaging criteria. The pricing subsystem 125 may provide a list of the identified composite channels (that match the one or more packaging criteria) to the application 110 and the application 110 may present or provide the list to the first channel curator.

In one embodiment, the first channel curator may select one or more of the identified composite channels (as discussed below in conjunction with FIGS. 2A and 2B) and the first channel curator may provide one or more prices to the pricing subsystem 125. The one or more prices may be fees or costs that the first channel curator may charge other channel curators of composite channels for including the first channel as part the composite channels. For example, the channel curator may provide a price of $2.00 that another channel curator would pay to the first channel curator in order to include the first channel in a composite channel of the other channel curator (e.g., in a composite channel associated with the other curator). The price of $2.00 may be paid for each user that subscribes to the composite channel (e.g., subscribes to the package). For example, if there are two-hundred subscribers to the composite channel and the first channel curator indicates a price of $2.00, then the other channel curator associated with the composite channel would owe the first channel curator $400.00 (e.g., $2.00× 200 subscribers).

In one embodiment, the one or more prices may be fixed prices. For example, the first channel curator may provide user input to the pricing subsystem 125 (via a GUI presented by application 110) indicating that the price for including the first channel in a first composite channel is $1.00 per subscriber of the first composite channel. The first channel curator may provide a different price for each selected composite channel or the first channel curator may use the same price for all the selected composite channels.

In another embodiment, the first channel curator may provide input to the pricing subsystem 125 indicating that the price to include the first channel in one or more composite channels is dynamic (e.g., is not fixed and/or may change). The pricing subsystem 125 may periodically (e.g., hourly, daily, weekly, monthly, yearly, etc.) determine a price for including the first channel in one or more composite channels based on one or more pricing factors. For example, the pricing subsystem 125 may determine a price for including the first channel in a composite channel based on a number of subscribers to the composite channel. In another example, the pricing subsystem 125 may determine a price for including the first channel in a composite channel based on a subscription fee for the composite channel. The dynamic price determined by the pricing subsystem (based on one or more pricing factors) may be a price per subscriber of the first composite channel that the second channel curator owes to the first channel curator. For example, if the pricing subsystem 125 determines a dynamic price of $1.50 for including the first channel in the first composite channel and there are one hundred subscribers to the first composite channel, the second channel curator may owe the first channel curator $150.00 (e.g., $1.40×100 subscribers). The pricing factors that the pricing subsystem 125 may use when determining a pricing for including the first channel in a composite channel may include, but are not limited to, a number of subscribers to the composite channel, a subscription fee or price of the composite channel, a number of subscribers to the first channel, a subscription fee or prices of the first channel, a number of component channels in the composite channel, a number of other composite channels that the first channel is included in, usage of the first channel, etc. The usage of a channel may be determined by determining a number of subscribers of the composite channel view media items from the first channel and/or by determining how many media items from the channel have been viewed by subscribers of the composite channel. The pricing subsystem 125 may use any number and/or combination of the factors when determining a price (e.g., a dynamic price per subscriber of the first composite channel) for including the first channel in a composite channel. For example, the pricing subsystem 125 may use the number of subscribers to the first channel to determine the price for including the first channel in the composite channel. In another example, the pricing subsystem 125 may use a number of component channels and the subscription fee for the composite channel to determine the price for including the first channel in the composite channel. Other examples of pricing factors may include, but are not limited to, the number of social shares for a channel and/or composite channel (e.g., the amount of indications or approvals, such as "likes," or the number of comments for a channel/composite channel), the geographic regions where the channel and/or composite channel is available, the number of subscribers that have subscribed to individual component channels of the composite channel (e.g., a number of a la carte subscribers to for the individual component channels), an amount of advertising revenue generated by the channel and/or composite channel, etc.

In one embodiment, the pricing subsystem 125 may determine a dynamic price for each composite channel identified by the first channel curator. For example, the first channel curator may identify three composite channels that may be allowed to include the first channel for a dynamic price per subscriber of the three composite channels. The pricing subsystem 125 may determine a dynamic price for each of the three composite channels based on the factors discussed above. In another embodiment, the dynamic prices for including the first channel in a composite channel may change periodically because the dynamic prices are determined periodically. For example, if the dynamic price for including the first channel in a composite channel is determined on a weekly basis, the dynamic price per subscriber of the first composite channel may change (e.g., may increase or decrease) every week.

The pricing subsystem 125 may provide the one or more prices (e.g., one or more fixed and/or one or more dynamic prices) to the other channel curators associated with the identified composite channels. For example, the pricing subsystem 125 may transmit or send a message, offer, and/or other data to the other channel curators indicating that the first channel curator is willing to allow the other channel curators to include the first channel in their composite channels for a price (e.g., that the first channel is available for inclusion in one or more composite channels). The message or offer may include the price when the price is a fixed (e.g., static) price. The message or offer may include data indicating that the price may be determined at a later time (e.g., may be determine once ever few days or few weeks) when the price is a dynamic price based on the factors discussed above.

In one embodiment, the first channel curator may not submit a query (e.g., may not search) for composite channels. The first channel curator may provide user input (via the application 110) to the pricing subsystem 125 indicating that the first channel curator is willing to allow any channel curator to include the first channel in other composite channels for a price (e.g., a fixed price or a dynamic price). The pricing subsystem 125 may store data indicating that the first channel may be included in other composite channels so that other channel curators may be able to identify the first channel when the other channel curators query the pricing subsystem 125 for channels to include in composite channels (as discussed in more detail below).

In one embodiment, dynamic pricing may be indicated by curators associated with composite channels instead of the first channel curator. For example, the pricing subsystem 125 may not allow the first channel curator to indicate that the first channel may be included for a dynamic price. Instead, the pricing subsystem 125 may allow the second channel curator associated with the first composite channel to indicate that the second channel curator wishes to include one or more channels in the composite channel for a dynamic price (as illustrated and discussed in more detail below in conjunction with FIG. 6B). The first composite channel may be included in the list of channels that match one or more packaging criteria and the first channel curator may indicate an acceptance of the dynamic price via a GUI (as illustrated and discussed in more detail below in conjunction with FIG. 2B).

Figures 4, 5:
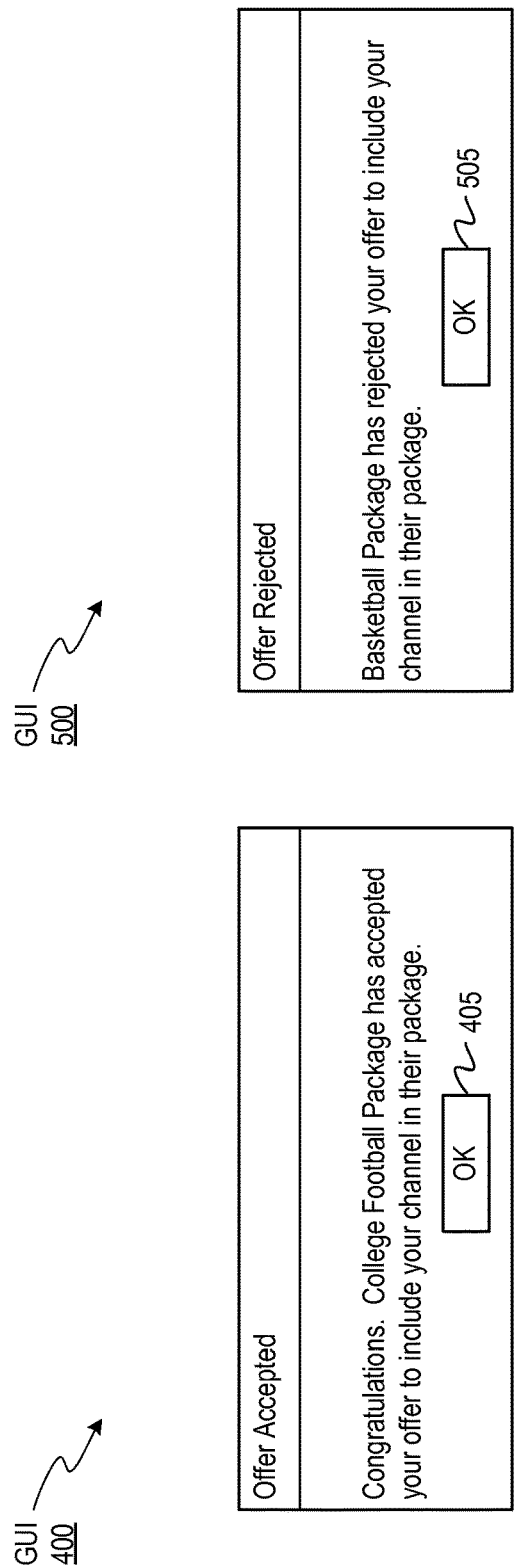
FIG. 4 is a diagram illustrating a GUI for indicating that a price for including a channel in a composite channel has been approved, according to one embodiment of the present disclosure.
FIG. 5 is a diagram illustrating a GUI for indicating that a price for including a channel in a composite channel has been rejected, according to one embodiment of the present disclosure.
Figure 7:
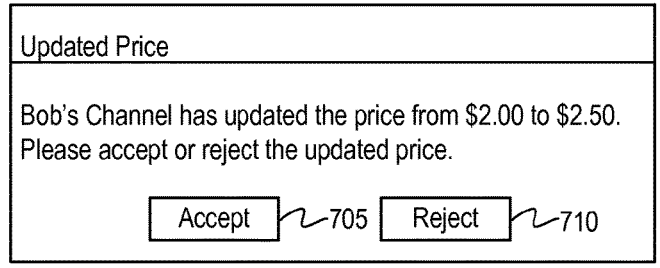
FIG. 7 is a diagram illustrating a GUI for indicating that a price for including a channel in a composite channel has been modified, according to one embodiment of the present disclosure.
Figure 8:
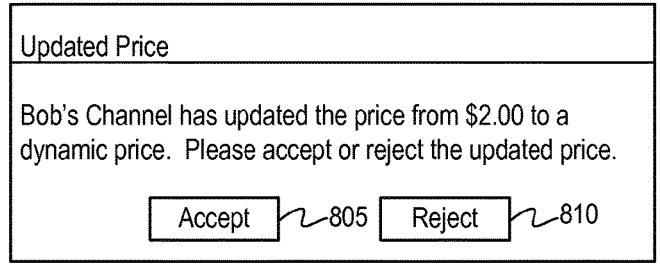
FIG. 8 is a diagram illustrating a GUI for indicating that a price for including a channel in a composite channel has been modified, according to another embodiment of the present disclosure.
Figure 9:
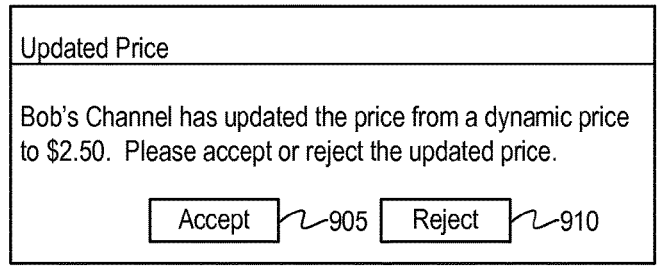
FIG. 9 is a diagram illustrating a GUI for indicating that a price for including a channel in a composite channel has been modified, according to a further embodiment of the present disclosure.

As discussed above, pricing subsystem 125 may provide a message or offer to other channel curators indicating that the first channel curator is willing to allow other channel curators to include the first channel in one or more composite channels for a price (e.g., for a fixed price or a dynamic price). A second channel curator may accept the price for including the first channel in a first composite channel associated with the second channel curator. For example, a second channel curator may provide user input via a GUI presented by the application 110 (as illustrated in FIGS. 7-9) indicating that the second channel curator approves or accepts the prices for including the first channel in the first composite channel. When the pricing subsystem 125 receives data indicating an approval from the second channel curator, the pricing subsystem 125 may include the first channel in the first composite channel. The pricing subsystem 125 may also store data indicating that the price (either fixed or dynamic) is associated with the first channel and the first composite channel. The pricing subsystem 125 may also provide an indication to the first channel curator indicating that the second channel curator has accepted the price for including the first channel in the first composite channel (as illustrated in FIG. 4).

In one embodiment, the first channel curator may change a fixed price for including the first channel in a composite channel to an updated fixed price. For example, the first channel curator may indicate to the pricing subsystem 125 that the price for including the first channel in the first composite channel is $1.00 per subscriber of the first composite channel. The first channel curator may later modify the price for including the first channel in the first composite channel to $2.00 per subscriber of the first composite channel. The pricing subsystem 125 may provide the updated price to the second channel curator. The second channel curator may provide user input (via a GUI presented or provided by application 110) indicating whether the second channel curator accepts the updated price or rejects the updated price. The pricing subsystem 125 may send or transmit a message to the first channel curator indicating whether the updated price was accepted or rejected (as illustrated in FIGS. 4 and 5). In another embodiment, the first channel curator may change the price for including the first channel in the first composite channel from a fixed price per subscriber of the first composite channel to a dynamic price per subscriber of the first composite channel or vice versa. The pricing subsystem 125 may transmit a message to the second channel curator indicating that the price has changed from a fixed price per subscriber of the first composite channel to a dynamic price per subscriber of the first composite channel (or vice versa) and allow the second channel curator to approve/accept or reject the change.

In one embodiment, the pricing subsystem 125 may provide reporting data 185 to the first channel curator to allow the first channel curator to better determine how to define prices and which composite channels should be offered the prices. For example, the pricing subsystem 125 may provide data indicating an estimated amount of revenue (e.g., money) that the first channel curator may receive if the first channel curator allows the first channel to be included in the first composite channel. The estimated revenue may be generated by advertisements that may be presented to end users when the end users consume (e.g., view) media items from the first channel and/or may be generated when the second channel curator pays the first channel curator the price for including the first channel in the first composite channel. The reporting data 185 may also include statistical information about one or more composite channels and/or the first channel. For example, the reporting data 185 may also include the number of subscribers to one or more composite channels, the number of subscribers for each component channel of the one or more composite channels (e.g., a number of a la carte subscribers for each component channel), revenue generated from subscribers (e.g., a la carte subscribers) to component channels of the one or more composite channels, etc. In further examples, the reporting data 185 may include, but is not limited to, advertising revenue generated by the one or more composite channels, advertisement revenue generated by each component channel of the one or more composite channels, prices for including other similar channels in the one or more composite channels (e.g., wholesale process for other similar channels), prices for including component channels in the one or more composite channels (e.g., wholesale prices for other component channels in a composite channel), a subject matter of a composite channel (e.g., sports, movies, art, etc.), a subscription fee or price for a composite channel, a number of component channels in a composite channel, a number of subscribers to a composite channel, geographic availability of a composite channel (e.g., a composite channel or package may be offered in certain countries), demographics of subscribers to a composite channel (e.g., age, gender, etc.), a name for a composite channel, etc. The reporting data 185 may be presented to the first channel curator when the first channel curator is identifying composite channels that may be allowed to include the first channel and/or when the first channel curator is updating a price for including the first channel in a composite channel.

In one embodiment, the pricing subsystem 125 may allow channel curators associated with composite channels to search for channels to include in the composite channels. The second channel curator may submit a query for one or more channels of the internet-based content platform 120 that are willing or available to be included in the first composite channel. For example, the second channel curator may submit the query using a GUI provided and/or presented by application 110. The second channel curator may want to include one or more channels that match one or more channel criteria in the first composite channel. The one or more channel criteria may be data, factors, conditions, criterion, rules, etc., that the second channel curator may use to determine whether to include other channels in the first composite channel. Examples of channel criteria may include, but are not limited to, a subject matter of an individual (component) channel (e.g., sports, movies, art, etc.), a subscription fee or price (e.g., an a la carte retail price) for a component channel, a number of subscribers to a component channel (e.g., a number of a la carte subscribers to a component channel), etc. Other examples of channel criteria include, but are not limited to, demographics of subscribers to a component channel (e.g., age, gender, etc.), geographic availability of a component channel, the number of social shares for a component channel (e.g., the amount of indications or approvals, such as "likes," or the number of comments for a component channel), a number of users that have viewed media items from a component channels, etc. The pricing subsystem 125 may receive the query and may identify component channels that match the one or more channel criteria.

In one embodiment, the pricing subsystem 125 may provide a list of the identified channels (that match the one or more channel criteria) to the application 110 and the application 110 may present or provide the list to the second channel curator. The list of identified channels may also include prices for the identified channels (e.g., may include data indicate a fixed price or indicating that the price is a dynamic price that may be determined at a later time). The second channel curator may provide input (via application 110) to the pricing subsystem 125 indicating that the second channel curator approves or accepts one or more prices for including one or more of the identified channels in the first composite channel (as illustrated in FIGS. 7-9). As discussed above, the pricing subsystem 125 may provide a message or other data to the channel curators associated with the channels selected by the second channel curator to include in the second composite channel.

Also as discussed above, the first channel curator may change the price for including the first channel in the first composite channel associated with the second channel curator (e.g., may update or change a fixed price from $2.00 per subscriber of the first composite channel to $3.00 per subscriber of the first composite channel, may change the price from a fixed price to a dynamic price or vice versa, etc.). The pricing subsystem 125 may provide the second channel curator with an indication that the first channel curator has changed the price (via a GUI presented by application 110). The second channel curator may provide user input indicating whether the second channel curator accepts or rejects the change in price and the pricing subsystem 125 may provide data indicating whether the change in price was accepted or rejected to the first channel curator (as discussed above).

In one embodiment, the pricing subsystem 125 may provide reporting data 185 to the second channel curator to allow the second channel curator to better determine which channels to include in the first composite channel. For example, the pricing subsystem 125 may provide data indicating an estimated amount of revenue (e.g., money) that the second channel curator may receive if the second channel curator includes the first channel in the first composite channel. The estimated revenue may be generated by advertisements that may be presented to end users when the end users consume (e.g., view) media items from the first channel and/or may be generated from subscription fees for the first composite channel. The reporting data 185 may also include statistical information about one or more composite channels and/or the first channel. For example, the reporting data 185 may also include the number of subscribers to one or more composite channels, the number of subscribers for each component channel of the one or more composite channels, etc. The reporting data 185 may be presented to the first channel curator when the first channel curator is identifying composite channels that may be allowed to include the first channel and/or when the first channel curator is updating a price for including the first channel in a composite channel. As discussed above, examples of reporting data include, but are not limited to, the number of subscribers to one or more composite channels, the number of subscribers for each component channel of the one or more composite channels (e.g., a number of a la carte subscribers for each component channel), revenue generated from subscribers (e.g., a la carte subscribers) to component channels of the one or more composite channels, advertising revenue generated by the one or more composite channels, advertisement revenue generated by each component channel of the one or more composite channels, prices for including other similar channels in the one or more composite channels (e.g., wholesale process for other similar channels), prices for including component channels in the one or more composite channels (e.g., wholesale prices for other component channels in a composite channel), a subject matter of a composite channel (e.g., sports, movies, art, etc.), a subscription fee or price for a composite channel, a number of component channels in a composite channel, a number of subscribers to a composite channel, geographic availability of a composite channel (e.g., a composite channel or package may be offered in certain countries), demographics of subscribers to a composite channel (e.g., age, gender, etc.), a name for a composite channel, etc.

Data store 150 may include any combination of subscription data 155, channel data 160, and reporting data 185. Subscription data 155 may include subscription data for users that have subscribed to channels identified in channel data 160 (e.g., registered users of an internet-based content platform). The subscription data 155 may include channels that a user has subscribed to, prices for the subscriptions (e.g., subscription fees), durations of the subscriptions, etc.

Channel data 160 may include identification information for various channels, such as an identifier of the channel (e.g., name), one or more identifiers (e.g., names) of content or media items associated with the channel, a list of media items in each channel, and/or whether individual media items in the channel are free or paid, etc. Channel data 160 can be used by the internet-based content platform 120 to generate a list of channels to present to users. The channel data 160 can be created based on input from a channel curator (e.g., subscription fees or prices for a channel, media item groups, etc.). For a composite channel, channel data 160 may also include identifiers of one or more component channels associated with the composite channel. A component channel may be a channel that is associated with (e.g., included as part of) a composite channel. In one embodiment, the channel data may also include prices for including one or more channels in composite channels. For example, the channel data 160 may indicate a price (fixed or dynamic) for including a channel in a composite channel.

As discussed above, the reporting data 185 may indicate an estimated amount of revenue that the channel curator may earn if a channel is added to a composite channel. The reporting data 185 may also include statistical information about one or more channels and/or composite channels.

During operation of internet-based content platform 120, a user accesses the internet-based content platform 120 via client/user device 105 over network 115. When a user navigates the internet-based content platform 120, the internet-based content platform 120 can present one or more lists of subscribable channels and/or composite channels. The user can navigate the internet-based content platform 120 to discover content and channels through keyword searching, browsing recommended channels, identifying other users' activity, such as by viewing channels or media items shared by others, or a combination thereof. Once the end user identifies content they would like to consume, the end user can take different actions depending on access restrictions placed on the content. The end user can subscribe (e.g., for free or by paying a subscription fee) to a channel to gain access to content. The subscription fee (e.g., price) can be a one-time fee, or can be a recurring fee. After creating the subscription for the end user, the internet-based content platform 120 can record the user subscription as subscription data 155 of data store 150. In situations in which the systems discussed herein collect personal information about users, or may make use of personal information, the users may be provided with an opportunity to control whether the content platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content platform 120.

FIGS. 2-10 illustrate example graphical user interfaces (GUIs) according to aspects of the present disclosure. The example GUIs can be provided by the pricing subsystem 125 and may be presented by and/or displayed within a web browser when channel curators access the internet-based content platform via the web browser. In another embodiment, the example GUIs may be an interface presented by an app, an application, a program, a software module/component, etc., that may be used to define channels, manage channels, and/or define prices. Some example GUIs include control elements in the form of a button (e.g., a button for subscribing to a channel). However, it should be noted that various other user interface elements can be used for selection by a channel curator such as a check box, a link, or any other user interface elements or components.

FIG. 2A is a diagram illustrating a GUI 200 for defining one or more prices for including a channel in one or more composite channels, according to one embodiment of the present disclosure. As discussed above, a first channel curator may provide one or prices for including a first channel (associated with the first channel curator) in one or more composite channels. The first channel curator may use the GUI 200 to provide the one or more prices to an internet-based content platform. The GUI 200 includes a search portion 210 and a results portion 220. The search portion 210 includes checkboxes 211-213, text fields 214-216, and button 217. The results portion 220 includes checkboxes 221, 222, 223, 228, radio buttons 224 through 227, radio buttons, 229 through 232, text fields 235 through 238, and button 234. The results portion 220 also includes checkbox 240, radio button 241, text field 242, and radio button 243.

As discussed above, a first channel curator associated with a first channel may submit a query for composite channels that match one or more packaging criteria. The search portion 210 may allow the first channel curator to submit queries for (e.g., to search for) composite channels that match one or more packaging criteria. The checkboxes 211, 212, and 213 allow the first channel curator to select one or more packaging criteria for the internet-based sharing platform to use when searching for composite channels. For example, checkboxes 211, 212, and 213 allow the user to search for composite channels based on the number of subscribers for the composite channels, subscription prices for the composite channels, and the number of component channels in the composite channels. The first channel curator may activate (e.g., click or select) one or more of the checkboxes 211, 212, and 213 to specify which packaging criteria should be used when searching for composite channels. The text fields 214, 215, and 216 allow the first channel curator to provide values for the packaging criteria. For example, text field 214 may allow the first channel curator to specify a packaging criterion of at least ten-thousand subscribers. In another example, text field 215 may allow the first channel curator to specify a packaging criterion indicating a subscription price that is less than or equal to $10.00. After the first channel curator provides packaging criteria (e.g., using one or more of the checkboxes 211, 212, 213 and text fields 214, 215, and 216), the first channel curator may activate (e.g., click or select) the button 217 to submit a query to the internet-based content platform for composite channels matching one or more packaging criteria.

The internet-based content platform may perform the query (e.g., the search) and a list of composite channels that match the one or more packaging criteria may be presented in the results portion 220 of the GUI 200. The results portion 220 specifies four packages (e.g., Football Package, Basketball Package, Sports Package, and College Football Package) that match the one or more packaging criteria specified by the first channel curator in search portion 210 of the GUI 200. The first channel curator may use checkboxes 221, 222, 223, and 228 to select one or more of the four composite channels. The first channel curator may use radio buttons 224-227 to indicate that a fixed price should be provided to curators of the selected composite channels and may use text fields 235-238 to specify the fixed prices to be provided to the curators of the selected composite channels. The first channel curator may use radio buttons 229-232 to indicate that a dynamic price per subscriber of the selected composite channels should be provided to the selected composite channels. As illustrated in FIG. 2A, checkboxes 221, 222, and 223 are activated (e.g., clicked or selected). Thus, a fixed price specified in text field 235 will be provided to the channel curator of the composite channel "Football Package," a dynamic price will be provided to the channel curator of the composite channel "Basketball Package," and a fixed price specified in text field 238 will be provided to the channel curator of the composite channel "College Football Package." The internet-based content platform may not provide a price to the channel curator of the composite channel "Sports Package" because the composite channel "Sports Package" is not selected (e.g., the checkbox 223 is not activated).

Checkbox 240 may allow the first channel curator to indicate that the fixed price (per subscriber of a composite channel) specified in text field 242 or a dynamic price (per subscriber of a composite channel) may be provided to any channel curator for any component channel that may want to include first channel in their composite channel. For example, instead of specifying a fixed price or a dynamic price for specific composite channels, the first channel curator may specify one fixed price and the fixed price may be provided to any channel curator that may want to include the first channel in their composite channel.

The first channel curator may use button 234 to provide the prices specified by the first channel curator (using radio buttons 224-227, radio buttons 229-232, and text fields 235-238) to channel curators associated with the selected composite channels. For example, when the first channel curator activates (e.g., clicks or selects) the button 234, the fixed price specified in text field 235 may be provided to the internet-based content platform and the internet-based content platform may provide the fixed price specified in text field 235 to the channel curator for the composite channel "Football Package."

In other embodiments, additional text fields, radio buttons, drop down menus, check boxes, radio buttons, lists boxes, menus, icons, and/or other user interface components (not shown in FIG. 2A) may be provided in the GUI 200 to obtain additional information from the channel curator. For example, the GUI may include additional text fields and checkboxes to allow the channel curator to specify more packaging criteria.

Figure 2B:
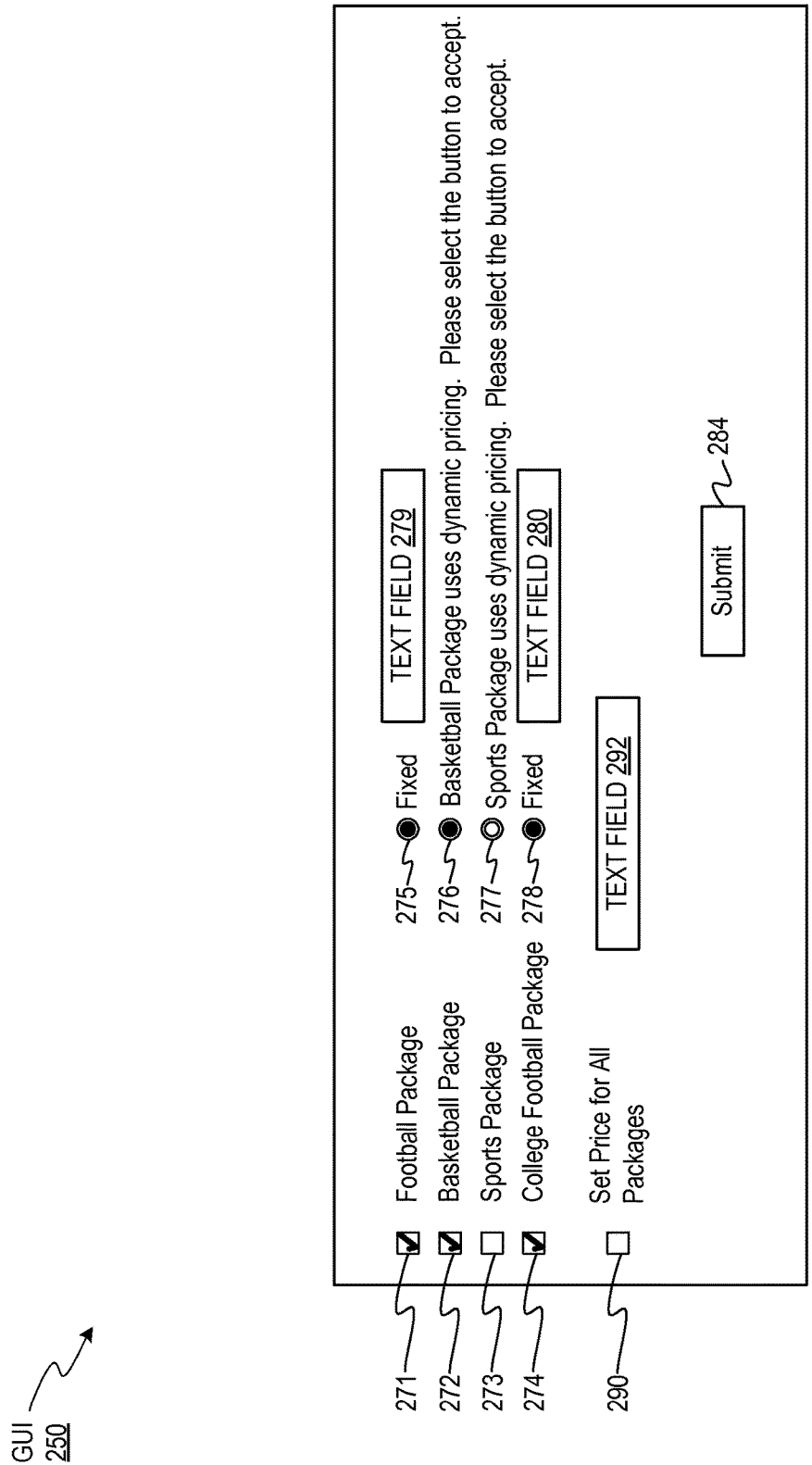
FIG. 2B is a diagram illustrating a graphical user interface (GUI) for defining one or more prices for including a channel in one or more composite channels, according to another embodiment of the present disclosure.

FIG. 2B is a diagram illustrating a graphical user interface (GUI) 250 for defining one or more prices for including a channel in one or more composite channels, according to another embodiment of the present disclosure. The GUI 250 includes checkboxes 271-274, radio buttons 275-278, text fields 279-280, checkbox 290, text field 292, and button 284. In one embodiment, the GUI 250 may be included as part of another GUI. For example, the GUI 250 may be the results portion for another GUI (similar to results portion 220 of the GUI 200 illustrated in FIG. 2).

As discussed above, the internet-based content platform may perform the query (e.g., the search) and a list of composite channels that match the one or more packaging criteria may be presented in the results portion GUI 250. The GUI 250 indicates that four packages (e.g., Football Package, Basketball Package, Sports Package, and College Football Package) that match the one or more packaging criteria specified by the first channel curator in search portion 210 of the GUI 200. The first channel curator may use checkboxes 221, 222, 223, and 228 to select one or more of the four composite channels. The first channel curator may use radio buttons 275 and 278 to indicate that a fixed price should be provided to the selected composite channels and may use text fields 279 and 280 to specify the fixed prices to be provided to the content curators associated with the selected composite channels. The first channel curator may also use radio buttons 276 and 277 to indicate the first channel curator is willing to accept a dynamic price (which may be periodically determined and/or determined later) to include the first channel in the composite channels "Basketball Package" and "Sports Package." As illustrated in FIG. 2B, checkboxes 271, 272, and 274 are activated (e.g., clicked or selected). Thus, a fixed price specified in text field 279 will be provided to the channel curator of the composite channel "Football Package," the first channel curator indicates and acceptance of the dynamic price for including the first channel in the composite channel "Basketball Channel," and a fixed price specified in text field 280 will be provided to the channel curator of the composite channel "College Football Package."

Checkbox 290 may allow the first channel curator to indicate that the fixed price (per subscriber of a composite channel) specified in text field 292 or a dynamic price (per subscriber of a composite channel) may be provided to any channel curator for any component channel that may want to include first channel in their composite channel. For example, instead of specifying a fixed price or accepting dynamic price for specific composite channels, the first channel curator may specify one fixed price and the fixed price may be provided to any channel curator that may want to include the first channel in their composite channel.

The first channel curator may use button 284 to provide the prices specified by the first channel curator to channel curators associated with the selected composite channels. For example, when the first channel curator activates (e.g., clicks or selects) the button 284, the fixed price specified in text field 279 may be provided to the internet-based content platform and the internet-based content platform may provide the fixed price specified in text field 279 to the channel curator for the composite channel "Football Package."

In other embodiments, additional text fields, radio buttons, drop down menus, check boxes, radio buttons, lists boxes, menus, icons, and/or other user interface components (not shown in FIG. 2B) may be provided in the GUI 250 to obtain additional information from the channel curator.

Figure 3:
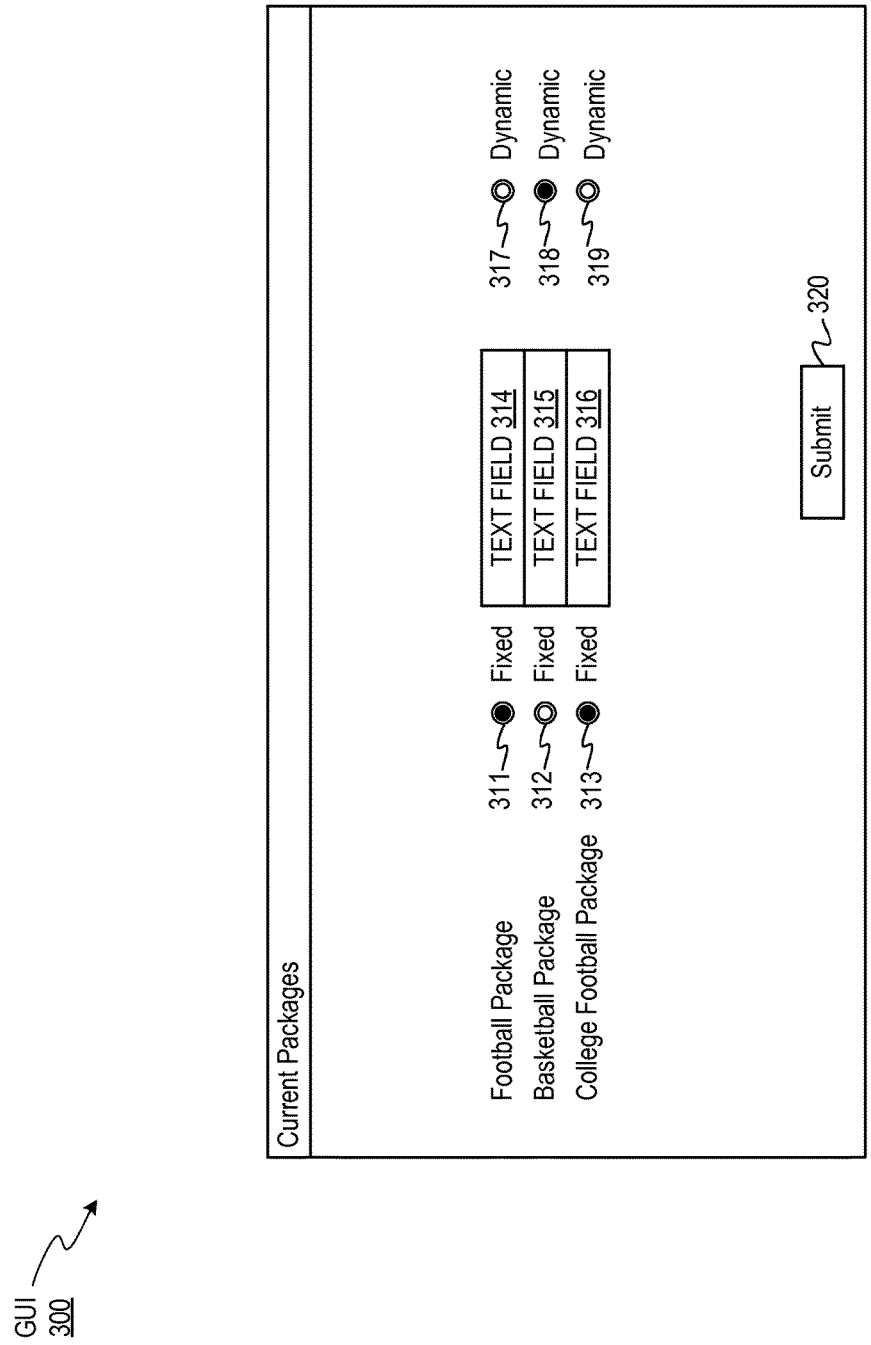
FIG. 3 is a diagram illustrating a GUI for modifying one or more prices for including a channel in one or more composite channels, according to one embodiment of the present disclosure.

FIG. 3 is a diagram illustrating a GUI 300 for modifying one or more prices for including a channel in one or more composite channels, according to one embodiment of the present disclosure. As discussed above, a first channel curator may provide one or more prices for including a first channel (associated with the first channel curator) in one or more composite channels. The first channel curator may use the GUI 300 to modify (e.g., update, change, increase, decrease, etc.) the one or more prices for including the first channel in one or more composite channels. The GUI 300 includes radio buttons 311-313, text fields 314-316 and radio buttons 317-319.

The GUI 300 may present a list of composite packages in the internet-based content platform that include the first channel associated with the first channel curator. The GUI 300 may also present the current prices (fixed and dynamic) for including the first channel in each composite channel in the list of composite channels. For example, the GUI 300 indicates that the first channel is included in the composite channel "Football Package" for a fixed price. The current fixed price may be displayed in text field 314. In another example, the GUI 300 indicates that the first channel is included in the composite channel "Basketball Package" for a dynamic price (per subscriber of the composite "Basketball Package").

The first channel curator may change the fixed price for including the first channel in a composite channel. For example, the first channel curator may change the price for including the first channel in the composite channel "Football Package." The first channel curator may enter the updated price into the text field 314 and may activate (e.g., click or select) the button 320. The updated price may be provided to the internet-based content platform and the internet-based content platform may provide the updated price to the channel curator associated with the composite channel "Football Package." The channel curator associated with the composite channel "Football Package" may indicate an approval (e.g., may approve) or may indicate a rejection (e.g., may reject) the updated price.

The first channel curator may also change the price for including the first channel in a composite channel from a fixed price to a dynamic price or vice versa. For example, the first channel curator may activate (e.g., click or select) the radio button 312 to change the price for including the first channel in the composite channel "Basketball Package" from a dynamic price (per subscriber of the composite channel "Basketball Package") to a fixed price (per subscriber of the composite channel "Basketball Package"). The first channel curator may provide a value for the fixed price using text field 315. In another example, the first channel curator may activate (e.g., click or select) the radio button 319 to change the price for including the first channel in the composite channel "College Football Package" from a fixed price (per subscriber of the composite channel "College Football Package") to a dynamic price (per subscriber of the composite channel "College Football Package"). The first channel curator may modify one or more of the prices and may activate (e.g., click or select) the button 320. The updated prices may be provided to the internet-based content platform and the internet-based content platform may provide the updated prices to channel curators associated with one or more composite channels.

FIG. 4 is a diagram illustrating a GUI 400 for indicating that a price for including a channel in a composite channel has been approved, according to one embodiment of the present disclosure. As discussed above, a first channel curator associated with a first channel may modify (e.g., update, change, increase, decrease, etc.) the one or more prices for including the first channel in one or more composite channels. A second channel curator associated with a first composite channel may approve the modified or updated price. The second channel curator may provide user input indicating an approval of the updated or modified price. The GUI 400 may be presented to the first channel curator after the second channel curator provides user input indicating an approval of the updated or modified price (e.g., after the second channel curator approves the updated or modified price).

The GUI 400 includes the text "Congratulations. College Football Package has accepted your offer to include your channel in their package." The GUI 400 also includes button 405. The first channel curator may activate (e.g., click or select) button 405 the GUI 400 to dismiss the GUI 400. In one embodiment, the GUI 400 may be overlaid over another GUI. For example, GUI 400 may be positioned or overlaid over the GUI 300 illustrated in FIG. 3. At least some portions, if not all of the user interface elements of the other GUI may remain visible under the GUI 400.

FIG. 5 is a diagram illustrating a GUI 500 for indicating that a price for including a channel in a composite channel has been rejected, according to one embodiment of the present disclosure. As discussed above, a first channel curator associated with a first channel may modify (e.g., update, change, increase, decrease, etc.) the one or more prices for including the first channel in one or more composite channels. A second channel curator associated with a first composite channel may reject the modified or updated price. The second channel curator may provide user input indicating a rejection of the updated or modified price. The GUI 500 may be presented to the first channel curator after the second channel curator provides user input indicating a rejection of the updated or modified price (e.g., after the second channel curator rejects the updated or modified price).

The GUI 500 includes the text "Basketball Package has rejected your offer to include your channel in their package." The GUI 500 also includes button 505. The first channel curator may activate (e.g., click or select) button 505 the GUI 500 to dismiss the GUI 500. In one embodiment, the GUI 500 may be overlaid over another GUI. For example, GUI 500 may be positioned or overlaid over the GUI 300 illustrated in FIG. 3. At least some portions, if not all of the user interface elements of the other GUI may remain visible under the GUI 500.

Figure 6A:
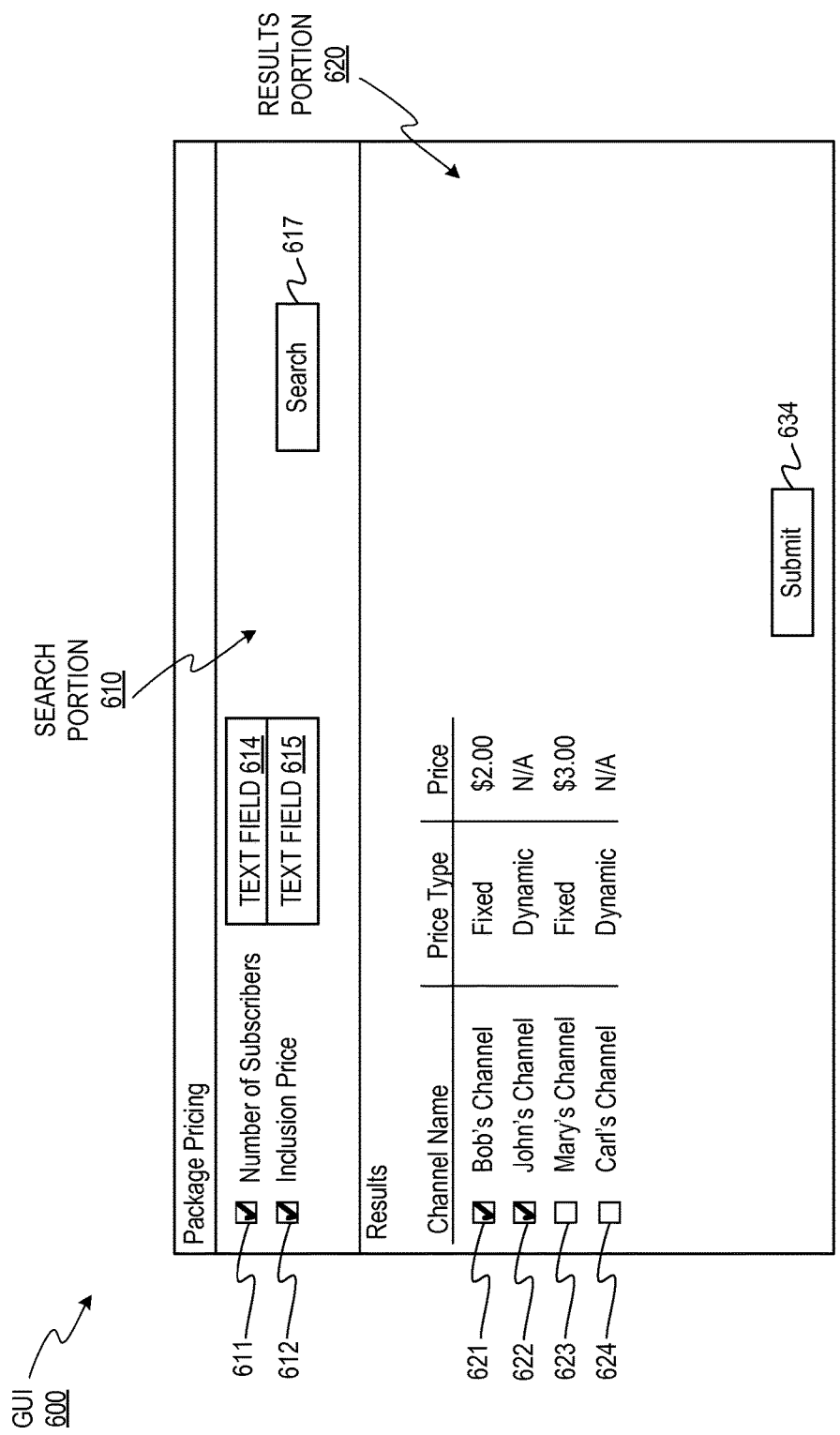
FIG. 6A is a diagram illustrating a GUI for selecting one or more channels to include in a composite channel, according to one embodiment of the present disclosure.

FIG. 6A is a diagram illustrating a GUI 600 for selecting one or more channels to include in a composite channel, according to one embodiment of the present disclosure. As discussed above, a second channel curator associated with a first composite channel may search for one or more channels to include in the first composite channel. The second channel curator may use the GUI 600 to search for and select one or more channels to include in the first composite channel. The GUI 600 includes a search portion 610 and a results portion 620. The search portion 610 includes checkboxes 611-612, text fields 614-615, and button 617. The results portion 620 includes checkboxes 621-624 and buttons 630 and 631.

As discussed above, a second channel curator associated with a first composite channel may submit a query for composite channels that match one or more channel criteria. The search portion 210 may allow the second channel curator to submit queries for (e.g., to search for) component channels that match one or more channel criteria. The checkboxes 611 and 612 allow the second channel curator to select one or more channel criteria for the internet-based sharing platform to use when searching for channels. For example, checkboxes 611 and 612 allow the user to search for component channels based on the number of subscribers for the channels and/or based on prices for including the channels in the first composite channel. The second channel curator may activate (e.g., click or select) one or more of the checkboxes 611 and 612 to specify which packaging criteria should be used when searching for channels to include in the first composite channel. The text fields 614 and 615 allow the second channel curator to provide values for the channel criteria. For example, text field 614 may allow the second channel curator to specify a channel criterion of at least fifty thousand subscribers. After the second channel curator provides packaging criterion (e.g., using one or more of the checkboxes 611-612 and text fields 614-615), the second channel curator may activate (e.g., click or select) the button 617 to submit a query to the internet-based content platform for channels matching one or more channel criteria.

The internet-based content platform may perform the query (e.g., the search) and a list of channels that match the channel criteria may be presented in the results portion 620 of the GUI 600. The results portion 620 indicates that four channels (e.g., Bob's Channel, John's Channel, Mary's Channel and Carl's Channel) match the one or more channel criteria specified by the second channel curator in search portion 610 of the GUI 600. The results portion 620 also indicates the prices and types of prices for each of the four channels. For example, the results portion 620 indicates that the channel "Bob's Channel" is associated with a fixed price of $2.00 per subscriber of the first composite channel (e.g., that there is a fee or a charge of $2.00 per subscriber of the first composite channel) for including the channel "Bob's Channel" in the first composite channel. In another example, the results portion 620 indicates that the "Carl's Channel" is associated with a dynamic price (e.g., the fee or charge per subscriber of the first composite channel for including Carl's Channel in the first composite channel may be determined based on one or more factors at a later time or periodically).

The second channel curator may use checkboxes 621, 622, 623, and 624 to select one or more of the four channels. As illustrated in FIG. 6A, checkboxes 621 and 622 are activated (e.g., clicked or selected). This may indicate that the second channel curator has approved the price for including the channel "Bob's Channel" in the first composite channel (e.g., second channel curator has approved the price of $2.00 per subscriber of the first composite channel). This may also indicate that the second channel curator has approved the price for including the channel "John's Channel" in the first composite channel (e.g., second channel curator has approved the dynamic price).

The second channel curator may use button 634 to indicate approval of the prices associated with Bob's Channel and John's Channel. For example, when the second channel curator activates (e.g., clicks or selects) the button 634, the data indicating that the second channel curator has approved the prices associated with Bob's Channel and John's Channel may be provided to the internet sharing platform. The internet sharing platform may indicate to the channel curators associated with Bob's Channel and John's Channel that the second channel curator is including Bob's Channel and John's Channel in the first composite channel and that the prices have been approved.

In other embodiments, additional text fields, radio buttons, drop down menus, check boxes, radio buttons, lists boxes, menus, icons, and/or other user interface components (not shown in FIG. 6A) may be provided in the GUI 600 to obtain additional information from the channel curator. For example, the GUI may include additional text fields and checkboxes to allow the channel curator to specify more packaging criteria.

Figure 6B:
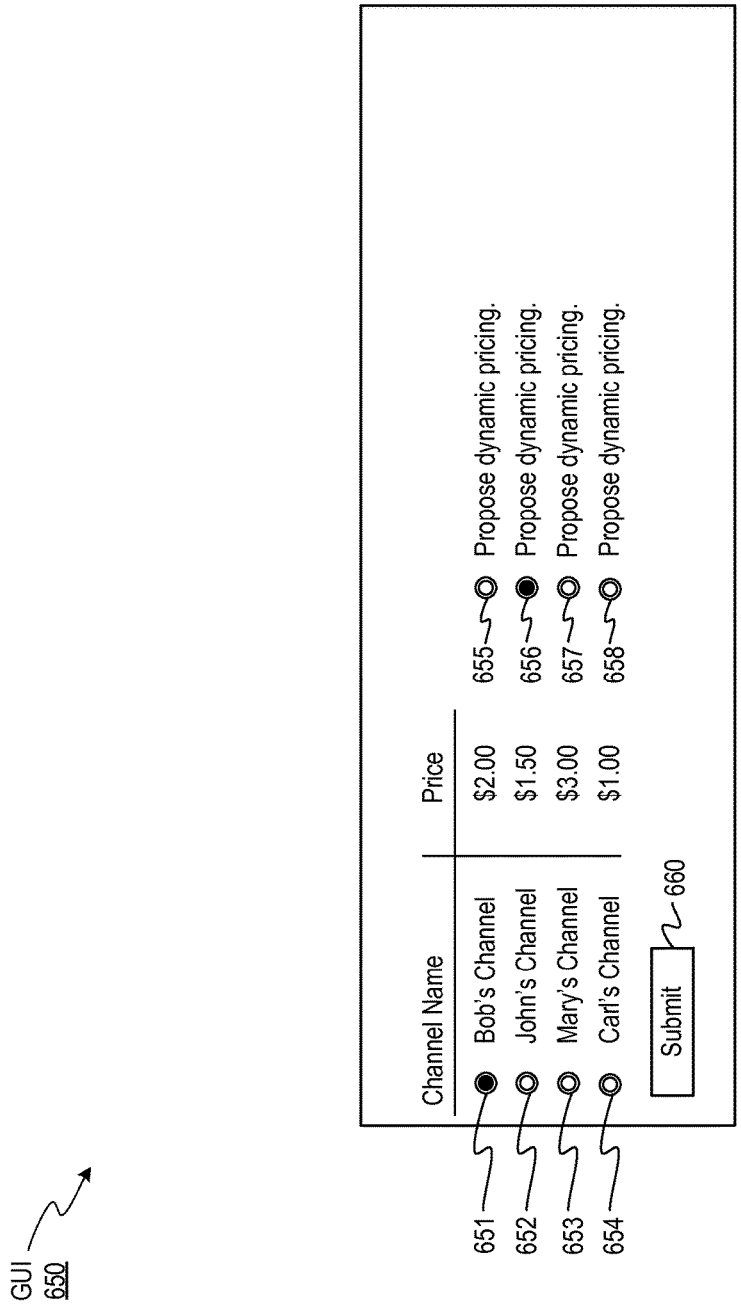
FIG. 6B is a diagram illustrating a GUI for selecting one or more channels to include in a composite channel, according to another embodiment of the present disclosure.

FIG. 6B is a diagram illustrating a GUI 650 for selecting one or more channels to include in a composite channel, according to another embodiment of the present disclosure. The GUI 650 includes radio buttons 651-658 and button 660. In one embodiment, the GUI 650 may be included as part of another GUI. For example, the GUI 650 may be the results portion for another GUI (similar to results portion 620 of the GUI 600 illustrated in FIG. 6).

The internet-based content platform may perform the query (e.g., the search) and a list of channels that match the channel criteria may be presented in the results GUI 650. The GUI 650 indicates that four channels (e.g., Bob's Channel, John's Channel, Mary's Channel and Carl's Channel) match the one or more channel criteria specified by the second channel curator. The GUI 650 also indicates the prices and types of prices for each of the four channels. For example, the results portion 620 indicates that the channel "Bob's Channel" is associated with a fixed price of $2.00 per subscriber of the first composite channel (e.g., that there is a fee or a charge of $2.00 per subscriber of the first composite channel) for including the channel "Bob's Channel" in the first composite channel.

The second channel curator may use radio buttons 651-654 to select one or more of the four channels. As illustrated in FIG. 6B, radio button 652 is activated (e.g., clicked or selected). This may indicate that the second channel curator has approved the price for including the channel "Bob's Channel" in the first composite channel (e.g., second channel curator has approved the price of $2.00 per subscriber of the first composite channel). Also as illustrated in FIG. 6B, radio button 656 is activated. This may indicate that the second channel curator wants to propose the use of a dynamic price for including John's Channel in the first composite channel.

The second channel curator may use button 634 to indicate approval of the prices associated with Bob's Channel and to propose the use of a dynamic price (e.g., propose dynamic pricing) for John's Channel. For example, when the second channel curator activates (e.g., clicks or selects) the button 634, data indicating that the second channel curator has approved the prices associated with Bob's Channel and data indicating that the second channel curator is proposing a dynamic price may be provided to the internet sharing platform. The internet-based sharing platform may indicate to the channel curator associated with Bob's Channel that the second channel curator is including Bob's Channel in the first composite channel and that the price has been approved. The internet-based sharing platform may also indicate to the channel curator associated with John's Channel that the second channel curator is proposing the use of a dynamic price (e.g., proposing a dynamic price for including John's Channel in the first composite channel).

In other embodiments, additional text fields, radio buttons, drop down menus, check boxes, radio buttons, lists boxes, menus, icons, and/or other user interface components (not shown in FIG. 6B) may be provided in the GUI 650 to obtain additional information from the channel curator.

FIGS. 7-9 are diagrams illustrating example GUIs 700, 800, and 900 for indicating that a price for including a channel in a composite channel has been modified, according to embodiments of the present disclosure. As discussed above, a first channel curator associated with a first channel may modify (e.g., update, change, increase, decrease, etc.) the one or more prices for including the first channel in one or more composite channels. A second channel curator associated with a first composite channel may reject the modified or updated price. The GUIs 700, 800, and 900 may be presented to the second to allow the second channel curator to approve or reject the updated or modified price.

Referring to FIG. 7, the GUI 700 includes the text "Bob's Channel has updated the price from $2.00 per subscriber of the first composite channel to $2.50 per subscriber of the first composite channel. Please accept or reject the updated price." The GUI 700 also includes buttons 705 and 710. The first channel curator may activate (e.g., click or select) button 705 the GUI 700 to provide an indication that the updated price has been approved to the internet-based sharing platform. The first channel curator may activate (e.g., click or select) button 710 the GUI 700 to provide an indication that the updated price has been rejected to the internet-based sharing platform. In one embodiment, the GUI 700 may be overlaid over another GUI. At least some portions, if not all of the user interface elements of the other GUI may remain visible under the GUI 700.

Referring to FIG. 8, the GUI 800 includes the text "Bob's Channel has updated the price from $2.00 per subscriber of the first composite channel to a dynamic price per subscriber of the first composite channel. Please accept or reject the updated price." The GUI 800 also includes buttons 805 and 810. The first channel curator may activate (e.g., click or select) button 805 the GUI 800 to provide an indication that the updated price has been approved to the internet-based sharing platform. The first channel curator may activate (e.g., click or select) button 810 the GUI 800 to provide an indication that the updated price has been rejected to the internet-based sharing platform. In one embodiment, GUI 800 may be overlaid over another GUI. At least some portions, if not all of the user interface elements of the other GUI may remain visible under the GUI 800.

Referring to FIG. 9, the GUI 900 includes the text "Bob's Channel has updated the price from a dynamic price per subscriber of the first composite channel to $2.50 per subscriber of the first composite channel. Please accept or reject the updated price." The GUI 900 also includes buttons 905 and 910. The first channel curator may activate (e.g., click or select) button 905 the GUI 900 to provide an indication that the updated price has been approved to the internet-based sharing platform. The first channel curator may activate (e.g., click or select) button 910 the GUI 900 to provide an indication that the updated price has been rejected to the internet-based sharing platform. In one embodiment, the GUI 900 may be overlaid over another GUI. At least some portions, if not all of the user interface elements of the other GUI may remain visible under the GUI 900.

Figure 10:
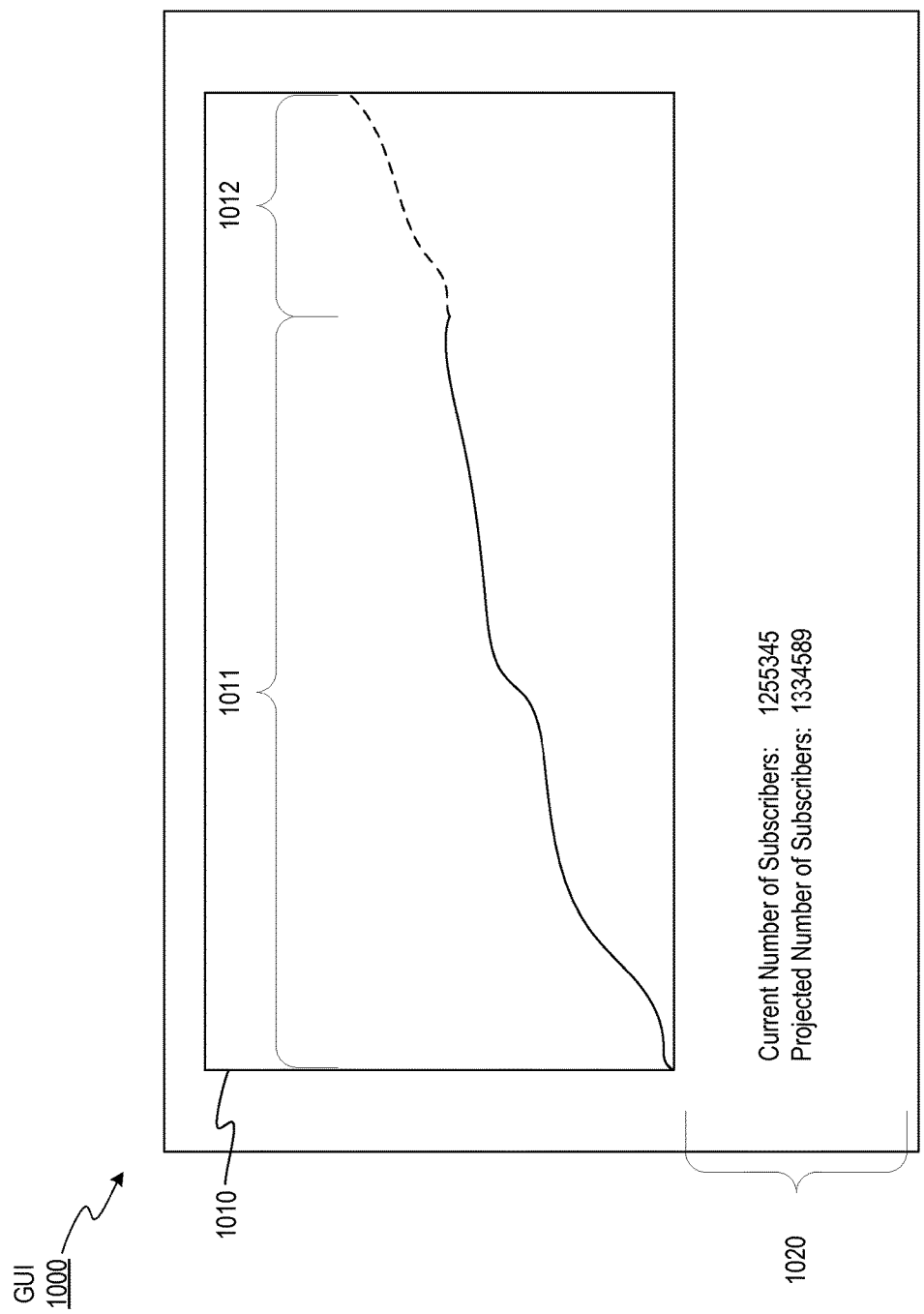
FIG. 10 is a diagram illustrating a GUI for presenting reporting data to a channel curator, according to one embodiment of the present disclosure.

FIG. 10 is a diagram illustrating a GUI 1000 for presenting reporting data to a channel curator, according to one embodiment of the present disclosure. As discussed above, an internet-based content platform may provide reporting data to a first channel curator associated with a channel of the internet based content platform to allow the first channel curator to better determine how to define process and identify composite channels. The internet-based content platform may also provide reporting data to a second channel curator associated with a composite channel of the internet based content platform to allow the second channel curator to better determine which channels to include in the first composite channel. The reporting data may be presented to channel curators via GUI 1000. The GUI 1000 includes a graph 1010 and portion 1020.

The graph 1010 includes two portions 1011 and 1012. Portion 1011 may present the amount of revenue generated by a channel or composite channel to a channel curator. As discussed above, the revenue for a channel or composite channel may be generated from a subscription fee (e.g., a price) paid by subscribers of the channel or composite channel and/or may be generated by advertisements (e.g., ads). In one embodiment, the portion 1012 may present an estimated amount of revenue that may be generated if a channel is included in a composite channel. For example, the graph 1010 may be presented to a first channel curator associated with a first channel to illustrate the estimated amount of revenue if the first channel curator allows a second channel curator associated with a first composite channel to include the first channel in the second composite channel at a certain price. In another example, the graph 1010 may be presented to a second channel curator associated with a first composite channel to illustrate the estimated amount of revenue if the second channel curator includes the first channel in the second composite channel at a certain price.

The portion 1020 presents a current number of subscribers to a channel and/or composite channel and also presents a projected number of subscribers to a channel and/or composite channel. In other embodiments, the portion 1020 may present data such as statistical information about one or more composite channels and/or channels. For example, the portion 1020 may present the number of subscribers for each component channel of the one or more composite channels, etc.

Figure 11:
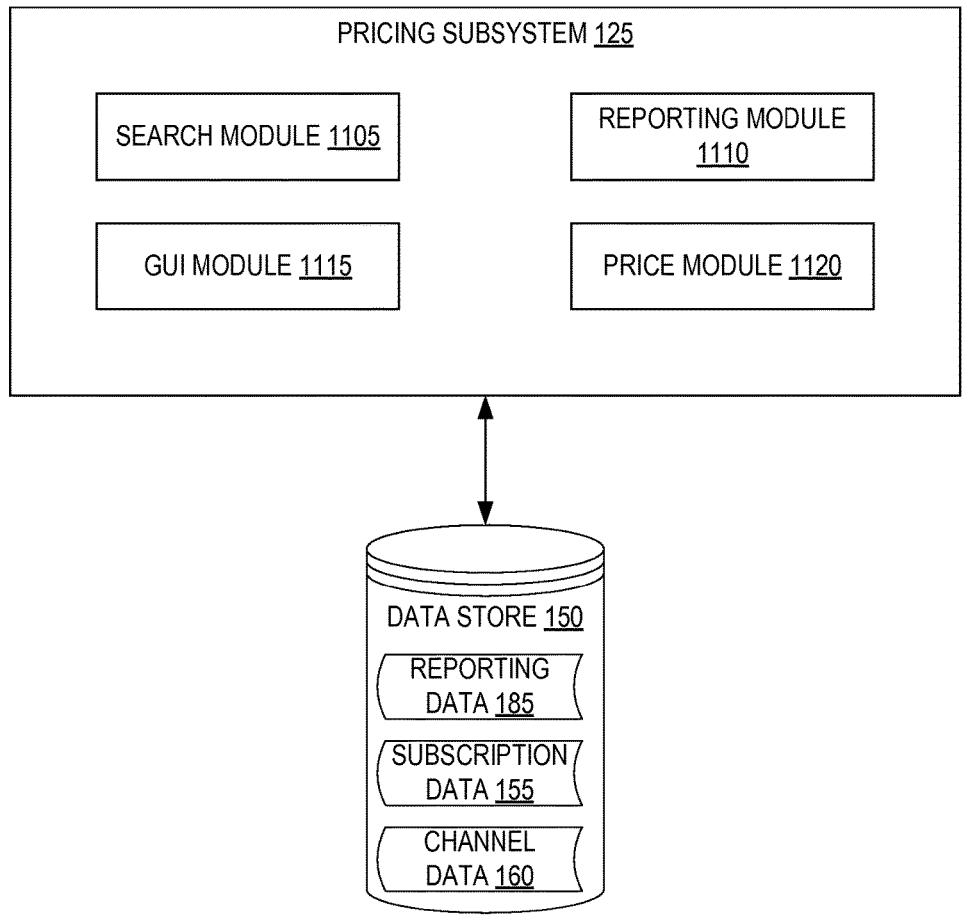
FIG. 11 is a block diagram of a pricing subsystem, according to one embodiment of the present disclosure.

FIG. 11 is a block diagram of a pricing subsystem 125, according to one embodiment of the present disclosure. The pricing subsystem 125 includes a search module 1105, a reporting module 1110, a GUI module 1115, and a price module 1120. More or less components may be included in the pricing subsystem 125 without loss of generality. For example, some modules may be combined into a single module, or any of the modules may be divided into two or more modules. In one implementation, one or more of the modules may reside on different computing devices (e.g., different server computers). The pricing subsystem 125 may be communicatively coupled to the data store 150. For example, pricing subsystem 125 may be coupled to the data store 150 directly or via a network (e.g., via network 115 as illustrated in FIG. 1). The data store 150 includes subscription data 155, channel data 160, and reporting data 185 (as discussed above in conjunction with FIG. 2A).

In one embodiment, the GUI module 1115 may generate and/or present GUIs to one or more channel curators. For example, the GUI module 1115 may present any of the GUIs illustrated in FIGS. 2-10 to a channel curator. The GUI module 1115 may also receive input provided by the channel curator. For example, text entered into a text field by a channel curator, the selection of a checkbox, a selection of an item in a drop down menu, etc., may be received by the GUI module 1115.

In one embodiment, the search module 1105 may search for composite channels based on one or more packaging criteria provided by a channel curator. For example, a channel curator may use GUI 200 illustrated in FIG. 2A to provide one or more packaging criteria to the ricing subsystem 125. The search module 1105 may search for composite channels that match the one or more packaging criteria and may provide data (e.g., provide a list) indicating the composite channels that match the one or more packaging criteria, to the channel curator (as illustrated in FIG. 2A). In another embodiment, the search module 1105 may search for channels channels based on one or more channel criteria provided by a channel curator. For example, a channel curator may use GUI 600 illustrated in FIG. 6A to provide one or more channel criteria to the pricing subsystem 125. The search module 1105 may search for channels that match the one or more channel criteria and may provide data (e.g., provide a list) indicating the channels that match the one or more channel criteria, to the channel curator (as illustrated in FIG. 6A).

In one embodiment, the pricing subsystem 120 may receive prices for including a first channel in one or more composite channels from a first channel curator. The price module 1120 may associate the prices with the first channel. For example, the price module 1120 may update the channel data 160 to indicate that the first channel curator has provided prices for including the first channel in one or more composite channels. When a second channel curator associated with a first composite channel approves a price for including the first channel, the pricing module 1120 may associate the price with both the first composite channel and the first channel. For example, the price module 1120 may update the channel data 160 to indicate that the first channel is included in the first composite channel for the approved price. In another embodiment, the price module 1120 may periodically determine a dynamic price for including the first channel in the first composite channel based on one or more pricing factors. For example, the price module 1120 may determine a dynamic price for including the first channel in the first composite channel based on a number of subscribers of the first composite channel.

In one embodiment, the reporting module 1110 may provide a channel curator with reporting capabilities for channels and/or composite channels. For example, the reporting module 1110 may analyze the subscription data 155 and the channel data 160 to generate reporting data 185. The reporting data 185 may indicate an estimated amount of revenue that the channel curator may earn if a channel is added to a composite channel. The reporting data 185 may also include statistical information about one or more channels and/or composite channels.

Figure 12:
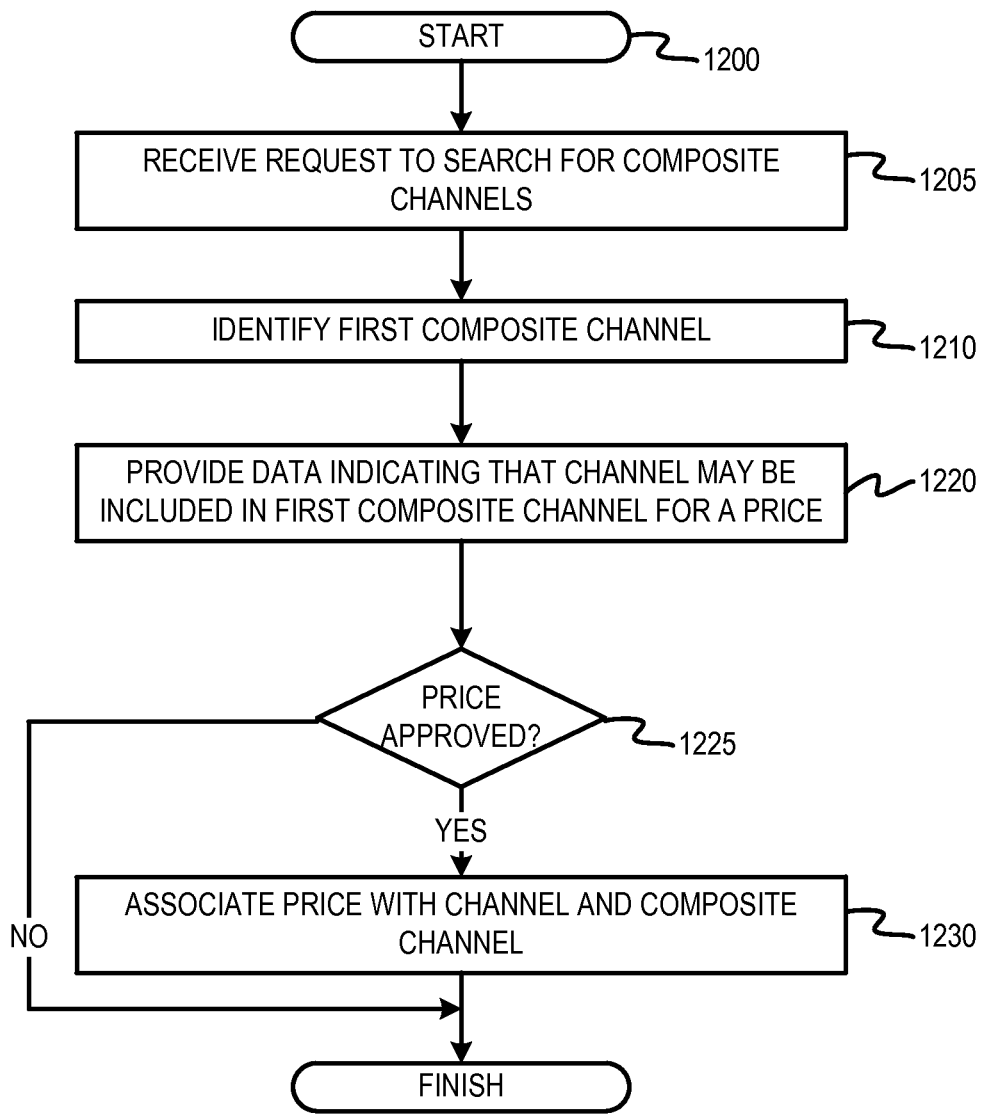
FIG. 12 is a flow diagram illustrating a method of defining a price for including a channel in a composite channel, in accordance with one embodiment of the present disclosure.
Figure 13:
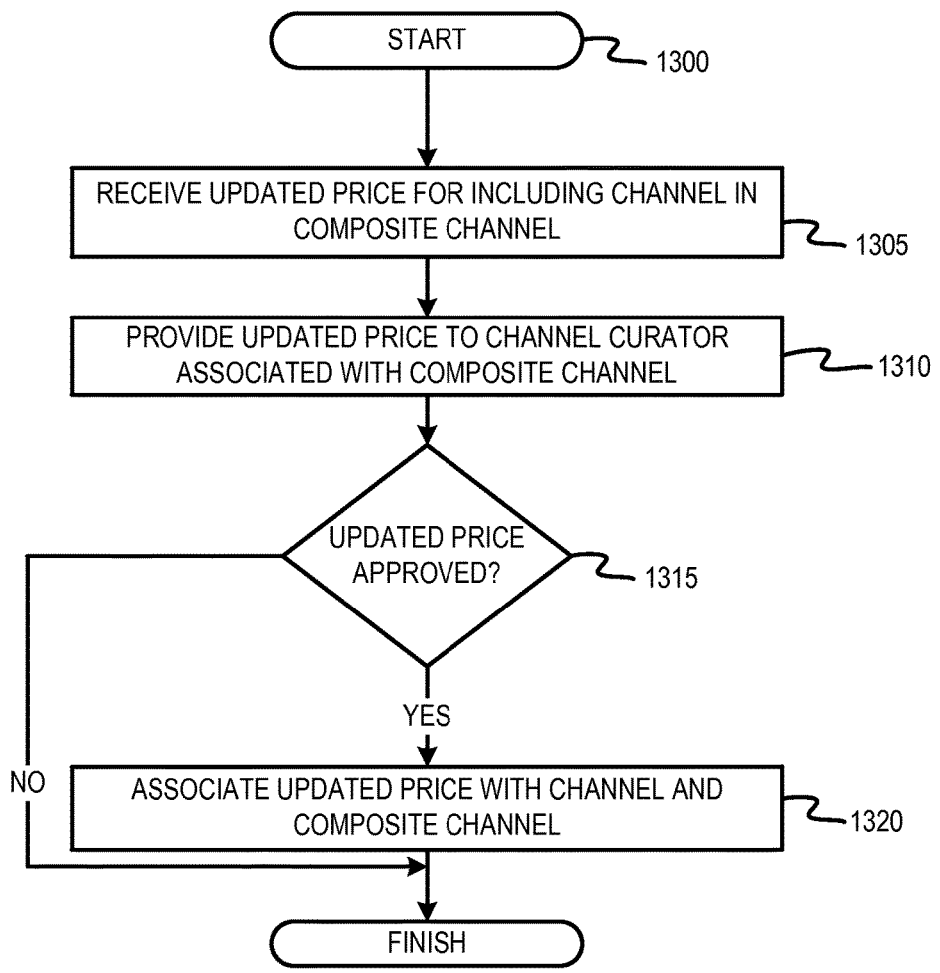
FIG. 13 is a flow diagram illustrating a method of defining a price for including a channel in a composite channel, in accordance with another embodiment of the present disclosure.
Figure 14:
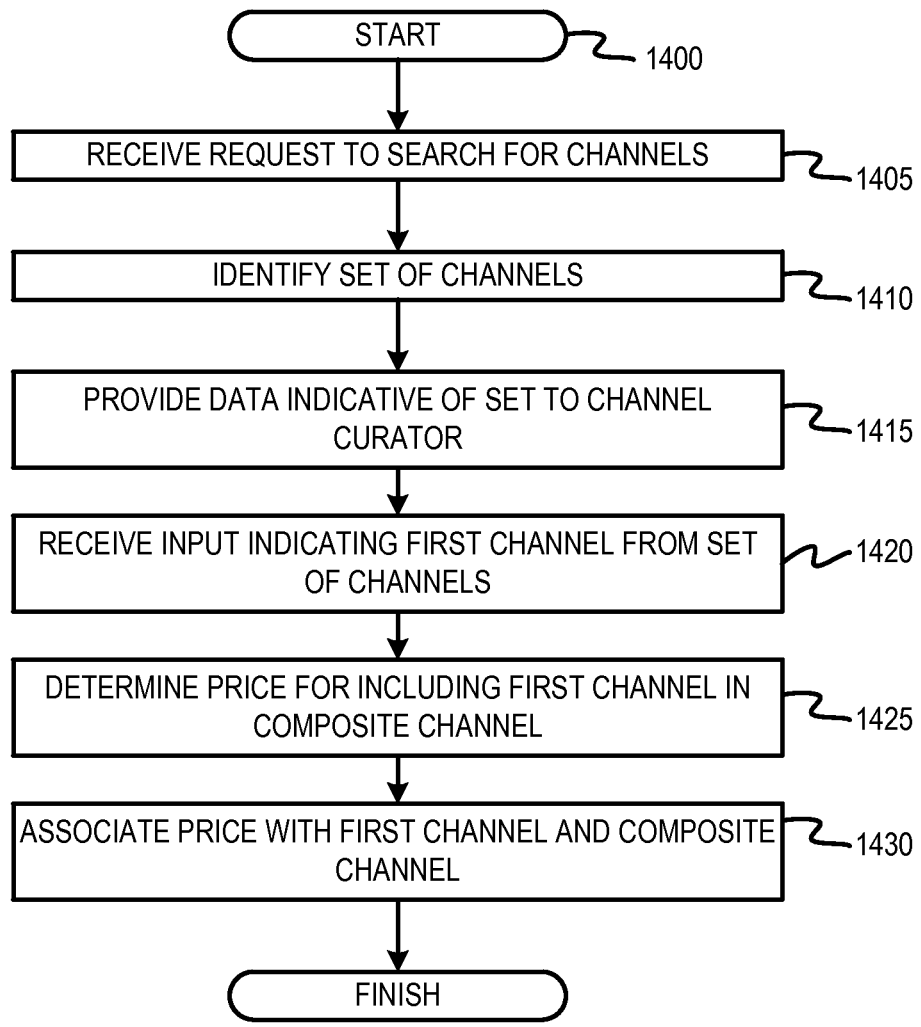
FIG. 14 is a flow diagram illustrating a method of including a channel in a composite channel, in accordance with one embodiment of the present disclosure.

FIGS. 12-14 are flow diagrams illustrating methods of defining prices for including channels in composite channels. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 12 is a flow diagram illustrating a method 1200 of defining a price for including a channel in a composite channel, in accordance with one embodiment of the present disclosure. The method 1200 may be performed by processing logic that comprises hardware (e.g., circuitry, dedicated logic, programmable logic, microcode, etc.), software (e.g., instructions run on a processor to perform hardware simulation), or a combination thereof. In one embodiment, method 1200 may be performed by a pricing subsystem, as illustrated in FIGS. 1 and 11.

Referring to FIG. 12 the method 1200 begins at block 1205 where the processing logic receives a request to search for one or more composite channels that match one or more packaging criteria. For example, a first channel curator associated with a channel may provide one or packaging criteria for one or more composite channels (as illustrated and discussed above in conjunction with FIGS. 1 and 2). At block 1210, the processing logic identifies a composite channel that matches the one or more packaging criteria (as illustrated and discussed above in conjunction with FIGS. 1, 2A and 2B). At block 1220, the processing logic provides data (e.g., a message) indicating that the first channel is available for inclusion in the first composite channel for a price (e.g., for a fixed price or for a dynamic price).

At block 1225, the processing logic determines whether the price was approved by the second channel curator. For example, the processing logic may determine whether user input indicating an approval of the price was received from the second channel curator. If the price is not approved by the second channel curator, the method 1200 ends. If the price is approved by the second channel curator, the processing logic proceeds to block 1230 where the processing logic associates the price with the channel (associated with the first channel curator) and the composite channel (associated with the second channel curator). For example, the processing logic may update channel data to indicate that the channel is included in the composite channel for the price approved by the second channel curator. After block 1230, the method 1200 ends.

FIG. 13 is a flow diagram illustrating a method 1300 of defining a price for including a channel in a composite channel, in accordance with another embodiment of the present disclosure. The method 1300 may be performed by processing logic that comprises hardware (e.g., circuitry, dedicated logic, programmable logic, microcode, etc.), software (e.g., instructions run on a processor to perform hardware simulation), or a combination thereof. In one embodiment, method 1300 may be performed by a pricing subsystem, as illustrated in FIGS. 1 and 11.

Referring to FIG. 13 the method 1300 begins at block 1305 where the processing logic receives an updated price for including a channel in a composite channel from a first channel curator associated with a channel (as illustrated and discussed above in conjunction with FIGS. 1 and 2). At block 1310, the processing logic provides the updated price to a second channel curator associated with the composite channel. At block 1315, the processing logic determines whether the updated price was approved by the second channel curator. For example, the processing logic may determine whether user input indicating an approval of the updated price was received from the second channel curator. If the updated price is not approved by the second channel curator, the method 1300 ends. If the updated price is approved by the second channel curator, the processing logic proceeds to block 1320 where the processing logic associates the updated price with the channel (associated with the first channel curator) and the composite channel (associated with the second channel curator). After block 1320, the method 1300 ends.

FIG. 14 is a flow diagram illustrating a method of including a channel in a composite channel, in accordance with one embodiment of the present disclosure. The method 1400 may be performed by processing logic that comprises hardware (e.g., circuitry, dedicated logic, programmable logic, microcode, etc.), software (e.g., instructions run on a processor to perform hardware simulation), or a combination thereof. In one embodiment, method 1400 may be performed by a pricing subsystem, as illustrated in FIGS. 1 and 11.

Referring to FIG. 14 the method 1400 begins at block 1405 where the processing logic receives a request to search for one or more channels that match one or more channel criteria. For example, a second channel curator associated with a composite channel may provide one or packaging criteria for one or more component channels (as illustrated and discussed above in conjunction with FIGS. 1 and 6). At block 1410, the processing logic identifies a set of component channels (e.g., one or more channels) that match the one or more channel criteria (as illustrated and discussed above in conjunction with FIGS. 1 and 6). The set of channels may be channels that are available to be included in the composite channel. For example, the set of channels may be channels where content curators associated with the channels have indicated that the channels may be include in composite channels for one or more prices. At block 1415, the processing logic provides data indicative of the set of channels (e.g., provides a list of the set of channels) to the channel curator. At block 1420, the processing logic receives user input from the second channel curator indicating a first component channel from the set of channels (as illustrated and discussed above in conjunction with FIGS. 1 and 6). The first channel may be associated with a price (e.g., a fixed price or a dynamic price) for including the first channel in the composite channel. At block 1425, the processing logic may determine the price for including the first channel in the composite channel (e.g., may determine a fixed price provided by the content curator for the first channel or may determine a dynamic price). At block 1430, the processing logic associates the price with the first channel and the composite channel. For example, the processing logic may update channel data to indicate that the first channel is included in the composite channel for the price approved by the second channel curator. After block 1430, the method 1400 ends.

Figure 15:
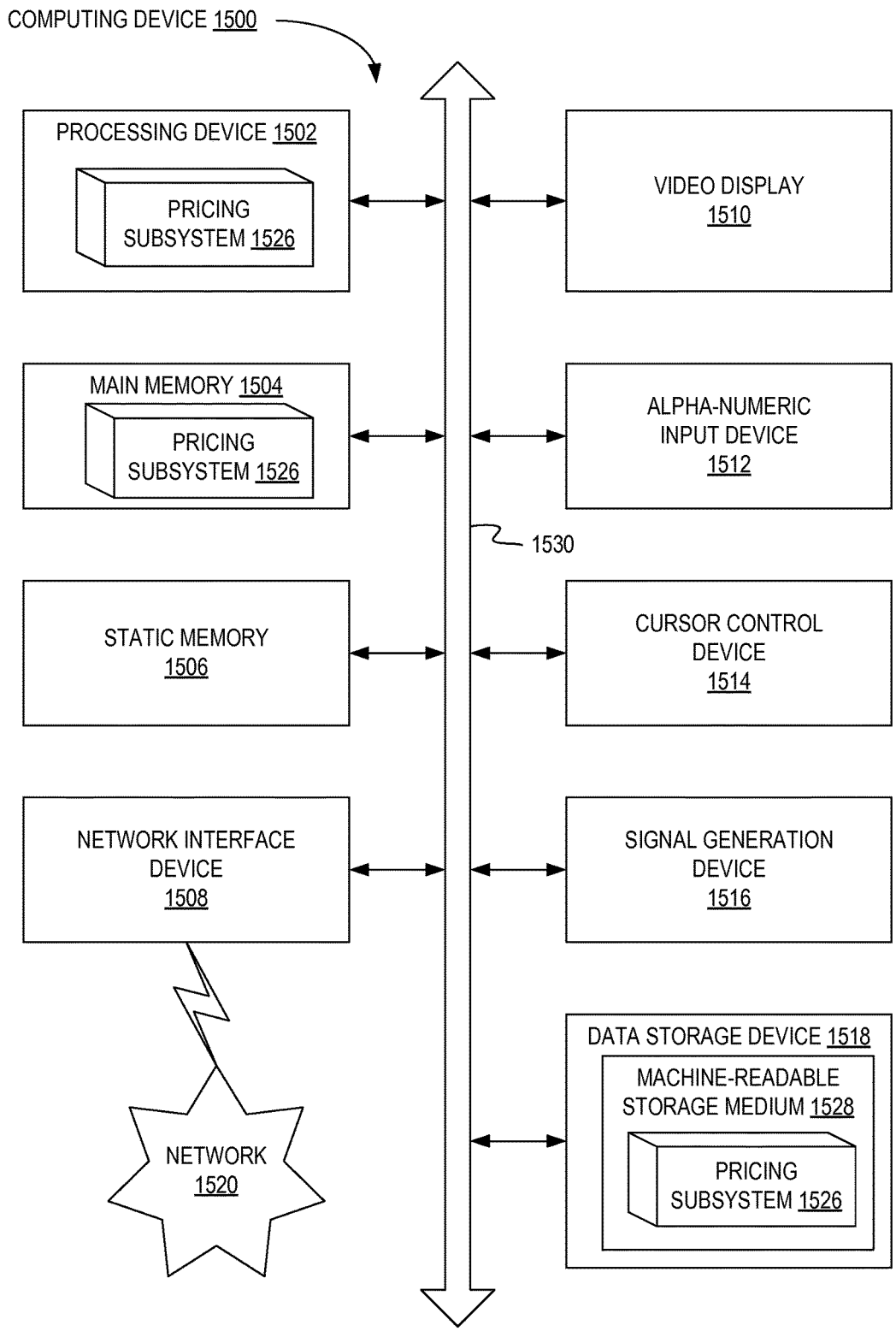
FIG. 15 illustrates block diagram of an example computing device that may perform one or more of the operations described herein.

FIG. 15 illustrates a diagrammatic representation of a machine in the example form of a computing device 1500 within which a set of instructions, for causing the machine to perform any one or more of the methodologies discussed herein, may be executed. The computing device 1500 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 1500 includes a processing device (e.g., a processor) 1502, a main memory 1504 (e.g., read-only memory (ROM), flash memory, dynamic random access memory (DRAM) such as synchronous DRAM (SDRAM)), a static memory 1506 (e.g., flash memory, static random access memory (SRAM)) and a data storage device 1518, which communicate with each other via a bus 1530.

Processing device 1502 represents one or more general-purpose processing devices such as a microprocessor, central processing unit, or the like. More particularly, the processing device 1502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1502 may also be one or more special-purpose processing devices such as an application specific integrated circuit (ASIC), a field programmable gate array (FPGA), a digital signal processor (DSP), network processor, or the like. The processing device 1502 is configured to execute pricing subsystem 1526 for performing the operations and steps discussed herein.

The computing device 1500 may further include a network interface device 1508 which may communicate with a network 1520. The computing device 1500 also may include a display device 1510 (e.g., a liquid crystal display (LCD) or a cathode ray tube (CRT)), an alphanumeric input device 1512 (e.g., a keyboard), a cursor control device 1514 (e.g., a mouse) and a signal generation device 1516 (e.g., a speaker). In one implementation, the display device 1510, the alphanumeric input device 1512, and the cursor control device 1514 may be combined into a single component or device (e.g., an LCD touch screen).

The data storage device 1518 may include a computer-readable storage medium 1528 on which is stored one or more sets of instructions (e.g., pricing subsystem 1526) embodying any one or more of the methodologies or functions described herein. The pricing subsystem 1526 may also reside, completely or at least partially, within the main memory 1504 and/or within the processing device 1502 during execution thereof by the computing device 1500, the main memory 1504 and the processing device 1502 also constituting computer-readable media. The instructions may further be transmitted or received over a network 1520 via the network interface device 1508.

While the computer-readable storage medium 1528 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "determining," "providing," "associating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. As used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method for providing a graphical user interface (GUI) to enable matching between a component channel and a composite channel in an internet-based content platform, comprising:

providing, by a processing device, the GUI to find and view, using a single window on a user device, composite channels with particular characteristics for a first channel in the internet-based content platform, the GUI comprising a query portion and a search result portion to be presented in the single window, the query portion of the GUI including a search control and a plurality of selectable visual indicators of a plurality of characteristics of composite channels, the GUI to be presented to a first channel curator associated with a first channel in the internet-based content platform;

receiving, via the query portion of the GUI, a query for the composite channels with the particular characteristics, the query being defined based on selection of one or more of the plurality of selectable visual indicators of the plurality of characteristics of composite channels by the first channel curator, wherein the query is received in response to the first channel curator selecting the search control in the query portion of the GUI;

identifying, by the processing device, the composite channels with the particular characteristics, the composite channels comprising a second channel associated with a second channel curator and a third channel associated with a third channel curator;

modifying, by the processing device, the search result portion of the GUI presented in the single window on the user device to include selectable visual indicators of the composite channels, and selectable visual indicators indicating multiple price determination options for each of the composite channels, wherein the multiple price determination options comprise a fixed option and a dynamic option;

receiving, via corresponding selectable visual indicators in the search result portion of the GUI in the single window, a selection of the second channel and the fixed option by the first channel curator for the second channel, and a selection of the third channel and the dynamic option by the first channel curator for the third channel;

receiving, by the processing device, a confirmation of the second channel curator to include the first channel in the second channel for a first price associated with the selected fixed option, and a confirmation of the third channel curator to include the first channel in the third channel for a second price associated with the selected dynamic option;

providing, by the processing device, the second channel and the third channel as composite channels including the first channel for presentation to end users of the internet-based content platform;

determining, by the processing device, the first price for including the first channel in the second channel based on a fixed subscriber fee for the second channel, as specified by the first channel curator, and a number of end users that subscribed to the second channel; and periodically determining the second price for including the first channel in the third channel based on a dynamic subscriber fee for the third channel and a number of end users that subscribed to the third channel, wherein periodically determining the second price comprises periodically determining, by the processing device, the dynamic subscriber fee for the third channel based at least on two or more of a number of component channels in the third channel, a number of other composite channels that the first channel is included in, a number of subscribers of the third channel that view media items from the first channel, a number of media items from the first channel that have been viewed by subscribers of the third channel, a number of social shares for the first channel, a number of social shares for the third channel, a geographic region where the first channel is available, or a geographic region where the third channel is available, wherein the first price and the second price are determined for presentation in the user interface.

2. The method of claim 1, further comprising:

associating the first price with the first channel and the second channel; and associating the second price with the first channel and the third channel.

3. The method of claim 1, further comprising:
receiving a second user input indicative of an updated first price;
providing the updated first price to the second channel curator associated with the second channel;
receiving, from the second channel curator, a third user input indicative of an approval of the updated first price; and
associating the updated first price with the first channel and the second channel.

4. The method of claim 3, further comprising:
providing reporting data to the first channel curator, the reporting data indicative of an estimated revenue based on the updated first price.

5. The method of claim 1, wherein the plurality of characteristics of composite channels comprises:
a threshold number of subscribers.

6. The method of claim 1, wherein the plurality of characteristics of composite channels comprises:
a threshold price.

7. The method of claim 1, wherein the plurality of characteristics of composite channels comprises:
a threshold number of component channels.

8. A method for providing a graphical user interface (GUI) to enable matching between a composite channel and a component channel in an internet-based content platform, comprising:
providing, by a processing device, the GUI to find and view, using a single window on a user device, component channels with particular characteristics for a first channel in the internet-based content platform, the GUI comprising a query portion and a search result portion to be presented in the single window, the query portion of the GUI including a search control and a plurality of selectable visual indicators of a plurality of characteristics of component channels, the GUI to be presented to a first channel curator associated with a first composite channel in the internet-based content platform;
receiving, via the query portion of the GUI, a query for the component channels with the particular characteristics, the query being defined based on selection of one or more of the plurality of selectable visual indicators of the plurality of characteristics of component channels by the first channel curator, wherein the query is received in response to the first channel curator selecting the search control in the query portion of the GUI;
identifying, by the processing device, a set of corresponding component channels with the particular characteristics, wherein each corresponding component channel in the set of corresponding component channels is available for inclusion in the first composite channel;
modifying, by the processing device, the search result portion of the GUI presented in the single window on the user device to include selectable visual indicators of the set of corresponding component channels and a price option of multiple price determination options for each of the set of corresponding component channels to the first channel curator, wherein the multiple price determination options comprise a fixed option and a dynamic option;
receiving, via corresponding selectable visual indicators in the search result portion of the GUI in the single window, a selection of a second component channel from the set of corresponding component channels and a selection of the dynamic option by the first channel curator for the second component channel;
receiving, by the processing device, a confirmation of a second channel curator of the second component channel to include the second component channel in the first composite channel for a first price associated with the selected dynamic option;
providing, by the processing device, the first composite channel including the second component channel for presentation to end users of the internet-based content platform; and
periodically determining the first price for including the second component channel in the first composite channel based on a dynamic subscriber fee and a number of end users that subscribed to the first channel, wherein periodically determining the second price comprises periodically determining, by the processing device, the dynamic subscriber fee based at least on two or more of a number of component channels in the first composite channel, a number of other composite channels that the second component channel is included in, a number of subscribers of the first composite channel that view media items from the second component channel, a number of media items from the second component channel that have been viewed by subscribers of the first composite channel, a number of social shares for the first composite channel, a number of social shares for the second component channel, a geographic region where the first composite channel is available, or a geographic region where the second component channel is available, wherein the first price is determined for presentation in the user interface.

9. The method of claim 8, further comprising:
associating the first price with the first composite channel.

10. The method of claim 9, further comprising:
receiving, from the second channel curator, an updated first price;
providing the updated first price to the first channel curator;
receiving, from the first channel curator, a fourth user input indicative of an approval of the updated first price; and
associating the updated first price with the first composite channel and the second component channel.

11. The method of claim 10, further comprising:
providing reporting data to the first channel curator, the reporting data indicative of an estimated revenue based on the updated first price.

12. The method of claim 8, wherein the one or more requested characteristics comprise:
a threshold number of subscribers.

13. The method of claim 8, wherein the one or more requested characteristics comprise:
a threshold price.

14. A system comprising:
a memory; and
a processing device, coupled to the memory, to:
provide a graphical user interface (GUI) to find and view, using a single window on a user device, composite channels with particular characteristics for a first channel in the internet-based content platform, the GUI comprising a query portion and a search result portion to be presented in the single window, the query portion of the GUI including a search control and a plurality of selectable visual indicators of a plurality of characteristics of composite channels, the GUI to be presented to a first channel curator associated with a first channel in the internet-based content platform;

receive, via the query portion of the GUI, a query for the composite channels with the particular characteristics, the query being defined based on selection of one or more of the plurality of selectable visual indicators of the plurality of characteristics of composite channels by the first channel curator, wherein the query is received in response to the first channel curator selecting the search control in the query portion of the GUI;

identify the composite channels with the particular characteristics, the composite channels comprising a second channel associated with a second channel curator and a third channel associated with a third channel curator;

modify the search result portion of the GUI presented in the single window on the user device to include selectable visual indicators of the composite channels, and selectable visual indicators indicating multiple price determination options for each of the composite channels, wherein the multiple price determination options comprise a fixed option and a dynamic option;

receive, via corresponding selectable visual indicators in the search result portion of the GUI in the single window, a selection of the second channel and the fixed option by the first channel curator for the second channel, and a selection of the third channel and the dynamic option by the first channel curator for the third channel;

receive a confirmation of the second channel curator to include the first channel in the second channel for a first price associated with the selected fixed option, and a confirmation of the third channel curator to include the first channel in the third channel for a second price associated with the selected dynamic option;

provide the second channel and the third channel as composite channels including the first channel for presentation to end users of the internet-based content platform;

determine the first price for including the first channel in the second channel based on a fixed subscriber fee for the second channel, as specified by the first channel curator, and a number of end users that subscribed to the second channel; and periodically determine the second price for including the first channel in the third channel based on a dynamic subscriber fee for the third channel and a number of end users that subscribed to the third channel, wherein to periodically determine the second price, the processing device is to periodically determine the dynamic subscriber fee for the third channel based at least on two or more of a number of component channels in the third channel, a number of other composite channels that the first channel is included in, a number of subscribers of the third channel that view media items from the first channel, a number of media items from the first channel that have been viewed by subscribers of the third channel, a number of social shares for the first channel, a number of social shares for the third channel, a geographic region where the first channel is available, or a geographic region where the third channel is available, wherein the first price and the second price are determined for presentation in the user interface.

15. A non-transitory computer-readable storage medium storing instructions which, when executed by a processing device, cause the processing device to perform operations comprising:

providing a graphical user interface (GUI) to find and view, using a single window, component channels with particular characteristics for a first channel in the internet-based content platform, the GUI comprising a query portion and a search result portion to be presented in the single window, the query portion of the GUI including a search control and a plurality of selectable visual indicators of a plurality of characteristics of component channels, the GUI to be presented to a first channel curator associated with a first composite channel in the internet-based content platform;

receiving, via the query portion of the GUI, a query for the component channels with the particular characteristics, the query being defined based on selection of one or more of the plurality of selectable visual indicators of the plurality of characteristics of component channels by the first channel curator, wherein the query is received in response to the first channel curator selecting the search control in the query portion of the GUI;

identifying a set of corresponding component channels with the particular characteristics, wherein each corresponding component channel in the set of corresponding component channels is available for inclusion in the first composite channel;

modifying, by the processing device, the search result portion of the GUI presented in the single window on the user device to include selectable visual indicators of the set of corresponding component channels and a price option of multiple price determination options for each of the set of corresponding component channels to the first channel curator, wherein the multiple price determination options comprise a fixed option and a dynamic option;

receiving, via corresponding selectable visual indicators in the search result portion of the GUI in the single window, a selection of a second component channel from the set of corresponding component channels and a selection of the dynamic option by the first channel curator for the second component channel;

receiving a confirmation of a second channel curator of the second component channel to include the second component channel in the first composite channel for a first price associated with the selected dynamic option;

providing the first composite channel including the second component channel for presentation to end users of the internet-based content platform; and periodically determining the first price for including the second component channel in the first composite channel based on a dynamic subscriber fee and a number of end users that subscribed to the first channel, wherein periodically determining the second price comprises periodically determining the dynamic subscriber fee based at least on two or more of a number of component channels in the first composite channel, a number of other composite channels that the second component channel is included in, a number of subscribers of the first composite channel that view media items from the second component channel, a number of media items from the second component channel that have been viewed by subscribers of the first composite channel, a number of social shares for the first composite channel, a number of social shares for the second component channel, a geographic region where the first composite channel is available, or a geographic region where the second component channel is available, wherein the first price is determined for presentation in the user interface.

* * * * *